United States Patent
Yasuda

(10) Patent No.: US 8,708,474 B2
(45) Date of Patent: Apr. 29, 2014

(54) INK COMPOSITION, INK SET AND IMAGE FORMING METHOD

(75) Inventor: Koji Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 229 days.

(21) Appl. No.: 13/219,712

(22) Filed: Aug. 29, 2011

(65) Prior Publication Data

US 2012/0069083 A1   Mar. 22, 2012

(30) Foreign Application Priority Data

Sep. 17, 2010 (JP) ................. 2010-209799

(51) Int. Cl.
*B41J 2/01*  (2006.01)

(52) U.S. Cl.
USPC .............. 347/100; 347/95; 347/96; 347/98

(58) Field of Classification Search
USPC ............... 347/21, 28, 95–100; 523/160, 161; 106/31.13, 31.27, 31.6
See application file for complete search history.

(56) References Cited

U.S. PATENT DOCUMENTS

| | | | |
|---|---|---|---|
| 2008/0233306 A1* | 9/2008 | Turgis et al. .................. | 427/511 |
| 2009/0246423 A1* | 10/2009 | Hosokawa et al. ........ | 428/32.64 |
| 2010/0075052 A1 | 3/2010 | Irita | |

FOREIGN PATENT DOCUMENTS

| | | |
|---|---|---|
| JP | 2008-024830 A | 2/2008 |
| JP | 2009-221281 A | 10/2009 |
| WO | 99019369 A | 4/1999 |
| WO | 03093378 A | 11/2003 |

OTHER PUBLICATIONS

English Lnaguage translation of the following: Office action dated Mar. 4, 2014 from the JPO in a Japanese patent application corresponding to the instant patent application. This office action translation is submitted now in order to supplement the understanding of paten document JP2008-024830 which is cited in the office action and is being disclosed in the instant information Disclosure Statement.

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

An ink composition includes a compound having a structure represented by the following Formula (I), a polymerization initiator and water;

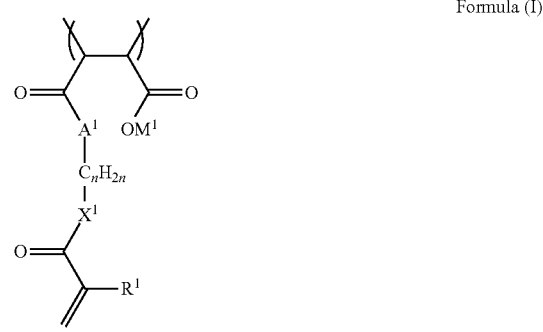

Formula (I)

wherein, in Formula (I), $R^1$ represents a hydrogen atom or a methyl group; $X^1$ represents —O— or —NH—; $A^1$ represents —O— or —NH—; $M^1$ represents a metal atom; and n represents an integer of from 1 to 10.

11 Claims, No Drawings

INK COMPOSITION, INK SET AND IMAGE FORMING METHOD

CROSS-REFERENCE TO RELATED APPLICATION

This Application claims priority under 35 USC 119 from Japanese Patent Application No. 2010-209799, filed on Sep. 17, 2010, the disclosure of which is incorporated by reference herein.

BACKGROUND OF THE INVENTION

1. Field of Invention

The present invention relates to an ink composition, an ink set and an image forming method.

2. Description of the Related Art

In recent years, paints and inks have been increasingly shifted to aqueous types in response to the increased need for resource conservation, environmental protection, improvement in operation stability, and the like. As an aqueous ink for forming a printed image having improved fixability, an ultraviolet curable aqueous ink has been known for a long time, for example.

An aqueous ink has been known in which a polymer compound having a polymerizable group at a side chain thereof is used as a water-soluble polymerizable compound applicable to such an ultraviolet curable aqueous ink (for example, see Japanese Patent Application Laid-Open (JP-A) No. 2009-221281).

SUMMARY OF THE INVENTION

However, there is room for improvement in JP-A No. 2009-221281, for example, from the viewpoint that the ink disclosed therein causes a phenomenon (blocking) in which when printed recording media are stacked on each other, ink is transferred from one printed recording medium to another printed recording medium stacked thereon.

The present invention has been made in view of the above circumstances and provides an ink composition, an ink set and an image forming method.

According to a first aspect of the invention, there is provided an ink composition including a compound having a structure represented by the following Formula (I), a polymerization initiator and water;

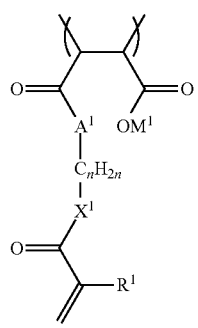

Formula (I)

wherein, in Formula (I), $R^1$ represents a hydrogen atom or a methyl group; $X^1$ represents —O— or —NH—; $A^1$ represents —O— or —NH—; $M^1$ represents a metal atom; and n represents an integer of from 1 to 10.

According to a second aspect of the invention, there is provided an ink set including:

the ink composition according to the first aspect of the invention; and a treatment liquid capable of forming an aggregate when contacting the ink composition.

According to a third aspect of the invention, there is provided an image forming method including:

applying the treatment liquid contained in the ink set according to the second aspect of invention, onto a recording medium; and applying the ink composition contained in the ink set, onto the recording medium, to form an image thereon.

DETAILED DESCRIPTION OF THE INVENTION

Ink composition

The ink composition of the invention contains a compound having a structure represented by the following Formula (I), a polymerization initiator and water, and optionally further contains a color material (preferably a pigment), a water-soluble organic solvent, or other additives. The compound may contain one structure represented by Formula (I) or may contain two or more structures each represented by Formula (I).

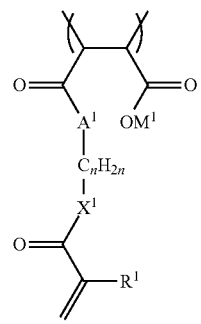

Formula (I)

In Formula (I), $R^1$ represents a hydrogen atom or a methyl group. $X^1$ represents —O— or —NH—. $A^1$ represents —O— or —NH—. $M^1$ represents a metal atom. n represents an integer of from 1 to 10.

Compound Having a Structure Represented by Formula (I)

The ink composition of the invention contains a compound having a structure represented by the following Formula (I).

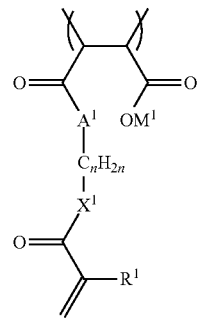

Formula (I)

In Formula (I), $R^1$ represents a hydrogen atom or a methyl group. $X^1$ represents —O— or —NH—. $A^1$ represents —O— or —NH—. $M^1$ represents a metal atom. n represents an integer of from 1 to 10.

The compound represented by the above Formula (I) is preferably water-soluble. Note that the term "water-soluble" used herein means that the compound represented by the above Formula (I) is soluble in the distilled water in an amount of at least 2% by mass with respect to distilled water at 25° C., but the compound is preferably soluble in the distilled water in an amount of at least 5% by mass, more preferably at least 10% by mass, and still more preferably at least 20% by mass. It is especially preferable that the compound uniformly dissolves in water in an arbitrary percentage.

$R^1$ in the above Formula (I) represents a hydrogen atom or a methyl group, and is preferably a hydrogen atom from the viewpoint of curing sensitivity or the like.

$X^1$ in the above Formula (I) represents —O— or —NH—, and is preferably —NH—.

$A^1$ in the above Formula (I) represents —O— or —NH—, and is preferably —O—.

$M^1$ in the above Formula (I) represents a metal atom. The metal atom is preferably an alkali metal atom. Examples of the alkali metal atom include a lithium atom, a sodium atom and a potassium atom. Among these atoms, the sodium atom and the potassium atom are preferable.

n in the above Formula (I) represents an integer of from 1 to 10, preferably an integer of from 1 to 6, and most preferably an integer of from 1 to 4.

$—C_nH_{2n}—$ may be a straight chain structure or a branched chain structure. Specific examples of $—C_nH_{2n}—$ include $—CH_2—$, $—(CH_2)_2—$, $—(CH_2)_3—$, $—(CH_2)_4—$, $—(CH_2)_6—$, $—(CH_2)_8—$, $—(CH_2)_{10}—$, $—C(CH_3)_2—$, $—CH_2CH(CH_3)CH_2—$ and $—CH_2CH(CH_3)CH_2CH(CH_3)CH_2—$.

In the above Formula (I), it is preferable that $X^1$ is —NH— and $A^1$ is —O—. In the above Formula (I), it is more preferable that $R^1$ is a hydrogen atom, $X^1$ is —NH—, $A^1$ is —O—, $M^1$ is Na or K, and n is an integer of from 1 to 4.

Specific examples of the structure represented by Formula (I) are shown below. However, the present invention is not limited to these examples.

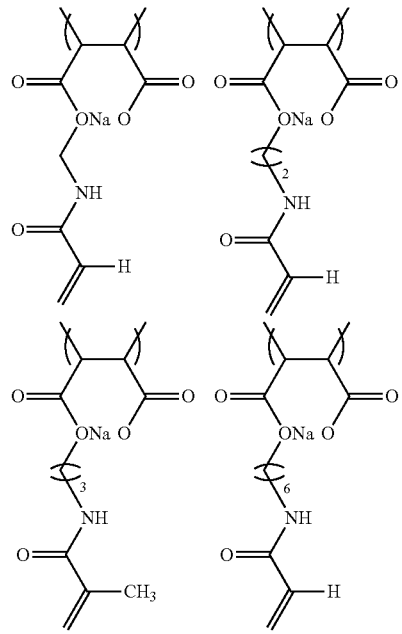

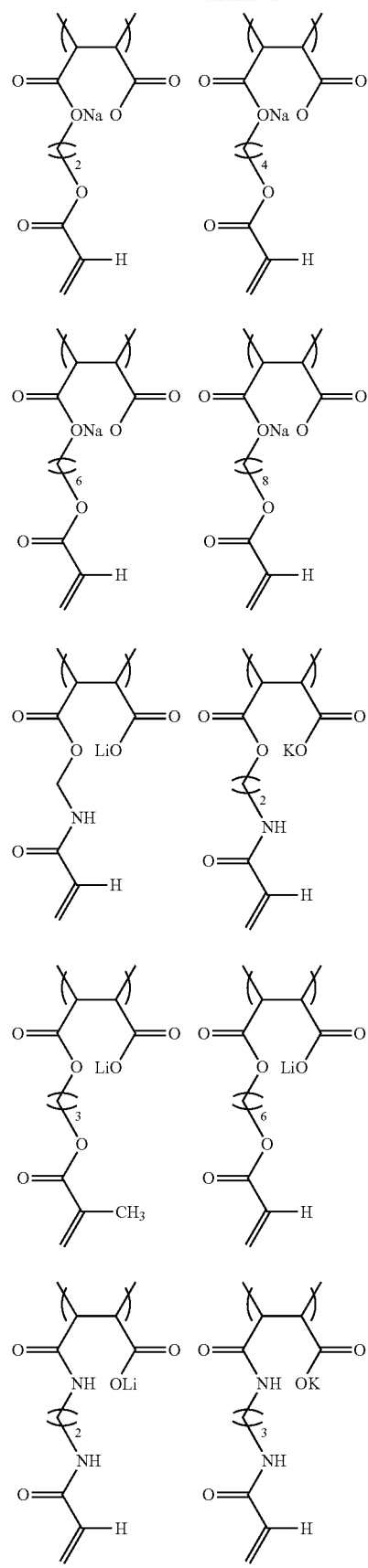

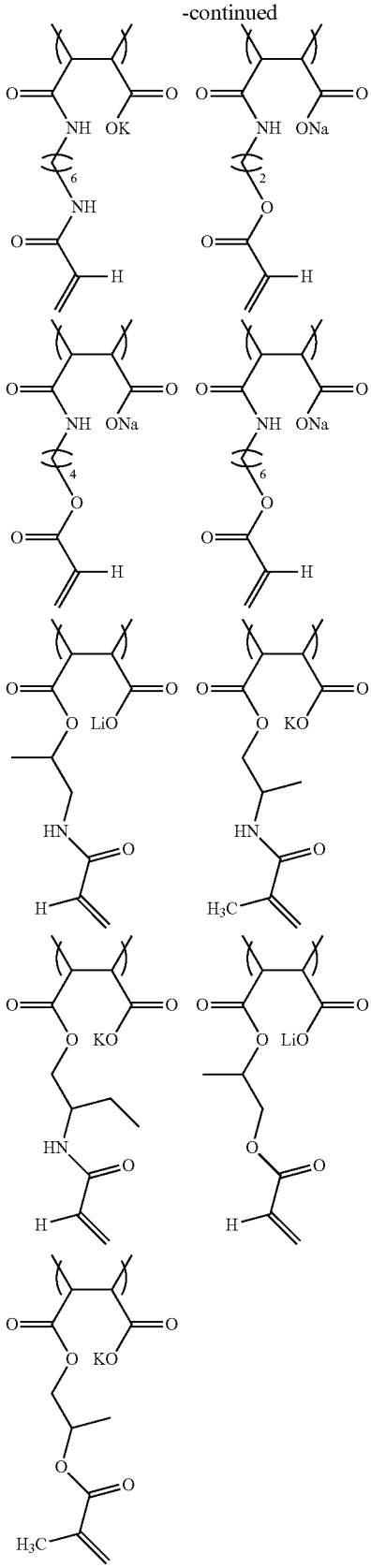

The compound having a structure represented by Formula (I) according to the invention may be a homopolymer or a copolymer including the structure represented by Formula (I) and other structure(s) as recurring units, but the compound is preferably the copolymer. In a case in which the compound represented by Formula (I) is the copolymer, a content of the structure represented by Formula (I) in the copolymer is preferably in a range of from 10 to 80 mol %, more preferably from 20 to 75 mol %, and most preferably from 30 to 70 mol %, with respect to the copolymer. Water solubility of the compound having a structure represented by Formula (I) can be favorably enhanced when the content of the structure represented by Formula (I) in the copolymer is in the above ranges.

It is preferable that the compound having a structure represented by Formula (I) according to the invention further contains a structure represented by the following Formula (II). The compound may include one structure represented by Formula (II) or two or more structures represented by Formula (II).

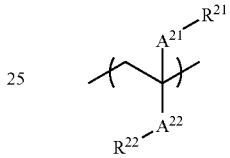

Formula (II)

In Formula (II), each of $R^{21}$ and $R^{22}$ independently represents a hydrogen atom, an alkyl group having from 1 to 20 carbon atoms, an aryl group having from 6 to 20 carbon atoms, or an aralkyl group having from 7 to 20 carbon atoms. Each of $A^{21}$ and $A^{22}$ independently represents a single bond or —O—.

However, when $A^{21}$ is —O—, $R^{21}$ is not a hydrogen atom, and when $A^{22}$ is —O—, $R^{22}$ is not a hydrogen atom.

In Formula (II), each of $R^{21}$ and $R^{22}$ independently represents a hydrogen atom, an alkyl group having from 1 to 20 carbon atoms, an aryl group having from 6 to 20 carbon atoms, or an aralkyl group having from 7 to 20 carbon atoms.

When at least one of $R^{21}$ or $R^{22}$ in Formula (II) has an alkyl group, the carbon number of the alkyl group is in a range of from 1 to 20, preferably from 1 to 16, and still preferably from 1 to 10.

Examples of the alkyl group having from 1 to 20 carbon atoms include an alkyl group having a straight chain structure or a branched chain structure, such as —$CH_3$, —$C_2H_5$, —$(CH_2)_2CH_3$, —$CH(CH_3)_2$, —$(CH_2)_3CH_3$, —$CH_2CH(CH_3)_2$, —$(CH_2)_4CH_3$, —$CH_2CH(CH_3)(CH_2)_4CH_3$, —$(CH_2)_9CH_3$, and —$(CH_2)_{15}CH_3$; and an alkyl group having a cyclic structure such as —$C_6H_{11}$ and —$C_8H_{15}$.

When at least one of $R^{21}$ or $R^{22}$ in Formula (II) has an aryl group, the carbon number of the aryl group is in a range of from 6 to 20, preferably from 6 to 14, and still preferably from 6 to 10.

Examples of the aryl group having from 6 to 20 carbon atoms include a phenyl group, a biphenyl group and a naphthyl group.

When at least one of $R^{21}$ or $R^{22}$ in Formula (II) has an aralkyl group, the carbon number of the aralkyl group is in a range of from 7 to 20, preferably from 7 to 15, and still preferably from 7 to 11.

Examples of the aralkyl group having from 7 to 20 carbon atoms include —$C_6H_4$—$(CH_2)_3CH_3$, —$C_6H_4$—$CH_2(CH_3)_2$, —$C_6H_4$—$(CH_2)_2$—$C_6H_5$, —$C_6H_4$—$(CH_2)_3$—$C_6H_5$ and —$C_{10}H_6$—$(CH_2)_3CH_3$.

In Formula (II), it is preferable that $R^{21}$ is a hydrogen atom or an alkyl group having from 1 to 20 carbon atoms, and $R^{22}$ is an alkyl group having from 1 to 20 carbon atoms, an aryl group having from 6 to 20 carbon atoms, or an aralkyl group having from 7 to 20 carbon atoms. It is more preferable that $R^{21}$ is a hydrogen atom and $R^{22}$ is an alkyl group having from 1 to 20 carbon atoms, an aryl group having from 6 to 20 carbon atoms, or an aralkyl group having from 7 to 20 carbon atoms. It is most preferable that $R^{21}$ is a hydrogen atom and $R^{22}$ is an alkyl group having from 1 to 20 carbon atoms, or an aryl group having from 6 to 20 carbon atoms.

In Formula (II), each of $A^{21}$ and $A^{22}$ independently represents a single bond or —O—.

In Formula (II), it is preferable that $A^{21}$ is a single bond and $A^{22}$ is a single bond or —O—. It is more preferable that $A^{21}$ is a single bond and $A^{22}$ is a single bond.

In Formula (II), it is preferable that $R^{21}$ is a hydrogen atom or an alkyl group having from 1 to 20 carbon atoms, $R^{22}$ is an alkyl group having from 1 to 20 carbon atoms, an aryl group having from 6 to 20 carbon atoms, or an aralkyl group having from 7 to 20 carbon atoms, $A^{21}$ is a single bond, and $A^{22}$ is a single bond or —O—. It is more preferable that $R^{21}$ is a hydrogen atom, $R^{22}$ is an alkyl group having from 1 to 20 carbon atoms, an aryl group having from 6 to 20 carbon atoms, or an aralkyl group having from 7 to 20 carbon atoms, $A^{21}$ is a single bond, and $A^{22}$ is a single bond or —O—. It is most preferable that $R^{21}$ is a hydrogen atom, $R^{22}$ is an alkyl group having from 1 to 20 carbon atoms or an aryl group having from 6 to 20 carbon atoms, $A^{21}$ is a single bond, and $A^{22}$ is a single bond.

Specific examples of the structure represented by Formula (II) are shown below. However, the present invention is not limited to these examples.

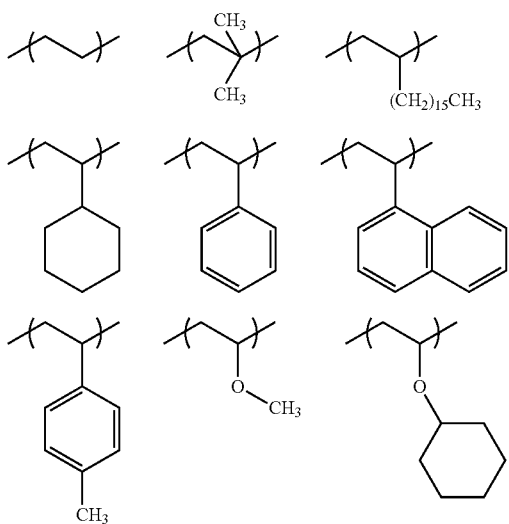

Furthermore, the compound having a structure represented by Formula (I) according to the invention may include one structure represented by the following Formula (III) or two or more structures represented by the following Formula (III).

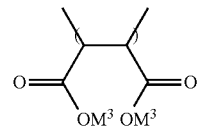

Formula (III)

In Formula (III), $M^3$ represents a metal atom. The metal atom is preferably an alkali metal atom. Examples of the alkali metal atom include a lithium atom, a sodium atom and a potassium atom. Among these atoms, a sodium atom and a potassium atom are preferable.

The compound having a structure represented by Formula (I) according to the invention preferably include a structure represented by the following Formula (I-1). The compound may contain one structure represented by the following Formula (I-1) or two or more structures trepresented by the following Formula (I-1).

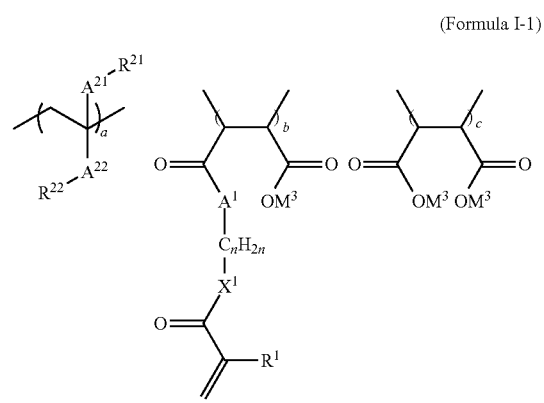

(Formula I-1)

In Formula (I-1), a represents a number from 10 to 80; b represents a number from 10 to 80; and c represents a number from 0 to 30, with the proviso that a+b+c=100. Note that each of a, b and c represents a molar ratio of each recurring unit.

Each of $R^1$, $X^1$, $A^1$, $M^1$ and n has the same definition, respectively, as $R^1$, $X^1$, $A^1$, $M^1$ and n in the above Formula (I), and the preferable ranges thereof are the same.

Each of $R^{21}$, $R^{22}$, $A^{21}$, and $A^{22}$ has the same definition, respectively $R^{21}$, $R^{22}$, $A^{21}$, and $A^{22}$ in the above Formula (II), and the preferable ranges thereof are the same.

$M^3$ has the same definition as $M^3$ in the above Formula (III), and the preferable ranges are the same.

In Formula (I-1), a represents a number from 10 to 80, preferably from 20 to 70, and more preferably from 30 to 65.

In Formula (I-1), b represents a number from 10 to 80, preferably from 20 to 75, and more preferably from 30 to 70.

In Formula (I-1), c represents a number from 0 to 30, preferably from 0 to 20, and more preferably from 0 to 15.

In Formula (I-1), it is preferable that a represents a number from 20 to 70, b represents a number from 20 to 75, and c represents a number from 0 to 20. It is most preferable that a represents a number from 30 to 65, b represents a number from 30 to 70, and c represents a number from 0 to 15.

Specific examples of the compound having a structure represented by Formula (I-1) of the present invention are shown below. However, the present invention is not limited to these examples. Note that "$M_n$" described below refers to a number average molecular weight obtained by measurement of the polymerizable compound of Formula (I-1) in which $M^1=M^3=H$ by GPC.

| | a | b | c | $M^1$ | $M^3$ | $M_n$ | Compound represented by Formula (I) |
|---|---|---|---|---|---|---|---|
| [structure 1] | 56 | 41 | 3 | Na | Na | 6,000 | 1 |
| | 56 | 41 | 3 | K | K | 6,000 | 2 |
| | 56 | 29 | 15 | Na | Na | 5,400 | 3 |
| | 56 | 13 | 31 | Na | Na | 4,000 | 4 |
| | 56 | 41 | 3 | Na | Na | 15,100 | 5 |
| [structure 2] | 56 | 39 | 5 | — | — | 5,800 | 6 |
| | 56 | 39 | 5 | — | — | 12,000 | 7 |
| [structure 3] | 56 | 41 | 3 | — | — | 6,400 | 8 |
| | 56 | 39 | 5 | — | — | 5,800 | 9 |
| [structure 4] | 50 | 40 | 10 | — | — | 12,000 | 10 |

-continued
| | a | b | c | $M^1$ | $M^3$ | $M_n$ | Compound represented by Formula (I) |
|---|---|---|---|---|---|---|---|
|  | 56 | 41 | 3 | — | — | 8,000 | 11 |
| | 56 | 30 | 14 | — | — | 6,800 | 12 |
| 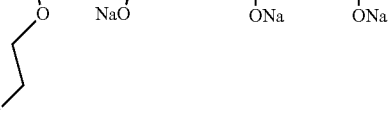 | 50 | 35 | 15 | — | — | 15,000 | 13 |
| 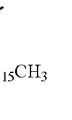 | 50 | 38 | 12 | — | — | 15,000 | 14 |
| 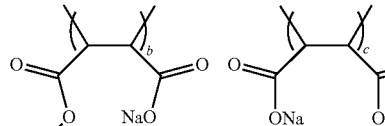 | 56 | 41 | 3 | — | — | 6,000 | 15 |
| | 56 | 32 | 12 | — | — | 5,000 | 16 |

-continued

| | a | b | c | $M^1$ | $M^3$ | $M_n$ | Compound represented by Formula (I) |
|---|---|---|---|---|---|---|---|
| [structure] | 56 | 41 | 3 | — | — | 6,000 | 17 |

* The mark "—" means not included.

The compound having a structure represented by Formula (I) according to the present invention can be obtained by reacting, in a solvent, a polymer having a structure of an acid anhydride derived from a maleic anhydride with a compound having a double bond, followed by neutralization of the resultant reactant with a base.

The number average molecular weight of the compound having a structure represented by Formula (I) according to the present invention is preferably in a range of from 500 to 70,000, more preferably from 1,000 to 50,000, and most preferably from 1,000 to 15,000.

Note that the above-described number average molecular weight may be calculated in terms of standard substance conversion by gel-permeation chromatography (GPC). The number average molecular weight is a value obtained by substituting a metal atom portion of the compound having a structure represented by Formula (I) with a hydrogen atom to perform measurement.

The content of the compound having a structure represented by the above Formula (I) in the ink composition of the invention is preferably in a range of from 0.1 to 50% by mass, more preferably from 0.5 to 40% by mass, and most preferably from 1 to 30% by mass, with respect to the ink composition, from the viewpoint of curing sensitivity or the like.

In the invention, improvement in both curing sensitivity of the ink composition and blocking resistance of a formed image can be successfully achieved by utilizing the compound having a structure represented by the above Formula (I) and a polymerization initiator. Though mechanisms for obtaining such effects of the invention are unknown, the present inventors speculate that they are as described below. In the invention, it is thought that curing of the ink composition favorably proceeds since the compound having a structure represented by the above Formula (I) is difficult to be decomposed by an acid, an alkali, or the like, and as a result, low-molecular components or the like in the ink composition can be inhibited from exuding to the surface of an image or the vicinity thereof, whereby blocking resistance and the like can be improved. Note that the above is only a speculation by the present inventors, and the present invention is not limited thereby.

Additional Polymerizable Compound

The ink composition of the invention may contain an additional polymerizable compound other than the compound having a structure represented by the above Formula (I), insofar as the effects of the invention are not impaired.

The additional polymerizable compounds is not limited, insofar as the additional polymerizable compound is a compound capable of polymerization other than the compound having a structure represented by the above Formula (I). The additional polymerizable compound is preferably a radically polymerizable compound, more preferably a radically polymerizable compound having an ethylenically-unsaturated bond, and most preferably a radically polymerizable compound having at least one ethylenically-unsaturated bond in the molecule thereof. Examples of the additional polymerizable compound include a compound having a chemical form, such as a monomer, an oligomer, or a polymer.

The additional polymerizable compound may be used singly or in a combination of two or more kinds thereof with appropriate ratios in order to improve the targeted properties.

Examples of the polymerizable compound having an ethylenically-unsaturated bond include radically polymerizable compound such as an unsaturated carboxylic acid (for example, acrylic acid, methacrylic acid, itaconic acid, crotonic acid, isocrotonic acid, and maleic acid, and a salt or a derivative thereof); anhydrides having an ethylenically-unsaturated group; acrylonitrile, styrene; and various unsaturated polyesters; unsaturated polyethers; unsaturated polyamides; and unsaturated urethanes.

Specific examples include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloyloxy polyethoxyphenyl)propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylol methane tetraacrylate, oligo ester acrylate, N,N-dimethylamino acrylamide, N,N-dimethylaminoethyl acrylamide, N,N-dimethylaminopropyl acrylamide, quaternized compounds thereof, N-methylol acrylamide, hydroxyethyl acrylamide, hydroxypropyl acrylamide, 4-acryloyl morpholine, N-[1,1-dimethyl-2-(sodiooxysulfonyl)ethyl]acrylamide, diacetone acrylamide, and epoxy acrylate; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylamino methyl methacrylate, 1,6-hexanediol dimethacrylate, ethyleneglycol dimethacrylate, triethyleneglycol dimethacrylate, polyethyleneglycol dimethacrylate, polypropyleneglycol dimethacrylate, trimethylolethane trimethacrylate, trimethylolpropane trimethacrylate, 2,2-bis(4-methacryloyloxy polyethoxyphenyl)propane, N,N-dimethylamino methacrylamide, N,N-dimethylaminoethyl methacrylamide, and N,N-dimethylaminopropyl methacrylamide; and derivatives of allyl compounds such as allyl glycidyl ether, diallylphthalate, and triallyl trimellitate.

In particular, a water-soluble polymerizable compound having an ethylenically-unsaturated bond is preferable from the viewpoint of the jetting stability of the ink composition. The "water soluble" used herein has the same definition as the "water soluble" for the compound having a structure represented by the above Formula (I).

Preferable examples of the water-soluble polymerizable compound having an ethylenically-unsaturated bond include at least one selected from the group consisting of acrylic acid, methacrylic acid, an ester derivative thereof, an amide derivative thereof, and a salt thereof. Examples include acrylic acid monoester and methacrylic acid monoester (hereinafter sometimes referred to as a "mono(meth)acrylate"), ester of acrylic acid and a polyol compound and ester of methacrylic acid and a polyol compound (hereinafter sometimes referred to as a "polyfunctional (meth)acrylate monomer" or a "polyfunctional (meth)acrylate oligomer"), acrylamide, methacrylamide, and a derivative thereof.

The water-soluble polymerizable compound having an ethylenically-unsaturated bond used in the invention may have at least one of a poly(ethyleneoxy) chain, a poly(propyleneoxy) chain, an ionic group (for example, a carboxyl group, a sulfo group, or the like), or a hydroxyl group, from the viewpoint of imparting water solubility.

When the water-soluble polymerizable compound having an ethylenically-unsaturated bond has a poly(ethyleneoxy) chain or a poly(propyleneoxy) chain, the number of ethyleneoxy units or propyleneoxy units is preferably in a range of from 1 to 10 and more preferably in a range of from 1 to 5.

The water-soluble polymerizable compound having an ethylenically-unsaturated bond to be used in the invention is preferably a (meth)acrylamide compound or a (meth)acrylate compound, more preferably a (meth)acrylamide compound having a hydroxyl group or a (meth)acrylate compound having a hydroxyl group, and most preferably a (meth)acrylamide compound having a hydroxyl group. Note that the term "(meth)acrylamide" refers to acrylamide and methacrylamide, and likewise, the term "(meth)acrylate" refers to acrylate and methacrylate.

The content of the additional polymerizable compound in the ink composition of the invention is preferably in a range of from 0.1 to 50% by mass, more preferably in the range of from 0.5 to 40% by mass, and still more preferably in a range of from 1 to 30% by mass, in terms of the solid content.

Further, a total content of the compound having a structure represented by the above Formula (I) and the additional polymerizable compound in the ink composition of the invention is preferably in a range of from 1 to 40% by mass, more preferably in a range of from 2 to 35% by mass, and most preferably in a range of from 3 to 30%, with respect to the ink composition.

Polymerization Initiator

The ink composition of the invention contains at least one polymerization initiator. As the polymerization initiator, a known polymerization initiator may be used without particular limitation. As the polymerization initiator in the invention, a photopolymerization initiator is preferably used.

Examples of a preferable photopolymerization initiator usable in the invention include (a) aromatic ketones, (b) acylphosphine compounds, (c) aromatic onium salt compounds, (d) organic peroxides, (e) thio compounds, (f) hexaarylbiimidazole compounds, (g) ketoxime ester compounds, (h) borate compounds, (i) azinium compounds, (j) metallocene compounds, (k) active ester compounds, (l) compounds having a carbon halogen bond, and (m) alkylamine compounds.

Examples of the photopolymerization initiator include acetophenone, 2,2-diethoxy acetophenone, p-dimethylamino acetophen, p-dimethyl amino propiophenone, benzophenone, 2-chlorobenzophenone, p,p'-dichlorobenzophene, p,p'-bis diethyl amino benzophenone, Michler's ketone, benzil, benzoin, benzoinmethyl ether, benzomethyl ether, benzoin isopropylether, benzoin n-propylether, benzoinisobutyl ether, benzoin-n-butyl ether, benzyl dimethyl ketal, tetramethyl thiuram monosulfide, thioxanthone, 2-chlorothioxanthone, 2-methyl thioxanthone, 1-hydroxy cyclohexyl phenyl ketone, 1-[4-(2-hydroxy ethoxy)-phenyl]-2-hydroxy-2-methyl-1-propane-1-one, 2-hydroxy-2-methyl-1-phenyl-1-one, 1-(4-isopropylphenyl)-2-hydroxy-2-methyl propane-1-one, and methyl benzoyl formate. Furthermore, for example, aromatic diazonium salts, aromatic halonium salts, aromatic sulfonium salts, metallocene compounds and the like, such as triphenyl sulfonium hexafluorophosphate, diphenyl iodonium hexafluoro antimonate and the like, can be included.

Specific examples of the polymerization initiator include the polymerization initiators described on pages 65 to 148 of "Shigaisen Koka Shisutemu (Ultraviolet Ray-Curing System)" written by Kiyoshi KATO (published by Sogo Gijutsu Center K.K. (1988)), the polymerization initiators described in Japanese Patent No. 3576862, and the polymerization initiators described in JP-A No. 2005-307198.

As the polymerization initiator used in the invention, any of a water-soluble polymerization initiator and a polymerization initiator in which a water-insoluble initiator has been dispersed in water may be used, but a water-soluble polymerization initiator is preferable. The "water solubility" of the polymerization initiator means that the polymerization initiator dissolves in distilled water at 25° C. in an amount of 0.5% by mass or more with respect to distilled water. The water-soluble polymerization initiator dissolves in distilled water at 25° C. in an amount of preferably 1% by mass or more and more preferably 3% by mass or more.

In the invention, the polymerization initiator may be used singly or in a combination of two or more kinds thereof.

The content of the polymerization initiator in the ink composition of the invention is preferably in a range of from 0.1 to 30% by mass, more preferably in a range of from 0.5 to 20% by mass, and still more preferably in a range of from 1 to 15% by mass, in terms of the solid content.

The content of the polymerization initiator in the ink composition of the invention is preferably in a range of from 0.01 to 35 parts by mass, more preferably from 0.1 to 30 parts by mass, and still more preferably from 0.5 to 30 parts by mass with respect to 100 parts by mass of a total content of the compound having a structure represented by the above Formula (I) and the additional polymerizable compound that is optionally contained in the ink composition.

Here, the content of the polymerization initiator refers to the total content of the polymerization initiators in the ink composition.

Water

The ink composition of the invention includes water, and further, as needed, contains at least one water-soluble organic solvent described below.

As for the water used in the invention, it is preferable to use water free from ionic impurities, such as ion exchanged water or distilled water. A content of water in the ink composition, though it is selected appropriately in accordance with purpose, generally the content is preferably from 10 to 95% by mass, more preferably from 30 to 90% by mass, and most preferably from 40 to 85% by mass, with respect to the ink composition.

Color Material

The ink composition of the invention preferably contains at least one color material. As the color material used in the invention, known dyes, pigments, or the like may be used without particular limitation. In particular, a color material that is almost insoluble or difficult to dissolve in water is preferable from the viewpoint of ink coloring properties. Specific examples include various pigments, disperse dyes, oil-soluble dyes, and coloring matter capable of forming a J-aggregate. From the viewpoint of lightfastness, pigments are more preferable.

The pigment in the invention is not particularly limited in the type, and known organic and inorganic pigments may be used.

Examples of the organic pigment include an azo pigment, a polycyclic pigment, dye chelate, a nitro pigment, a nitroso pigment, and aniline black. Among the above, an azo pigment, a polycyclic pigment, and the like are more preferable. Examples of the azo pigment include an azo lake, a insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include basic dye type chelate and acid dye type chelate.

Examples of the inorganic pigment include titanium oxide, iron oxide, calcium carbonate, barium sulfate, aluminum hydroxide, barium yellow, cadmium red, chrome yellow, and carbon black. Among the above, carbon black is particularly preferable. Examples of the carbon black include those manufactured by a known method such as a contact method, a furnace method, or a thermal method.

Specific examples of the pigment usable in the invention include the pigments described in Paragraphs [0142] to [0145] of JP-A No. 2007-100071.

Examples of pigments for orange or yellow include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 151, C.I. Pigment Yellow 155, C.I. Pigment Yellow 180 and C.I. Pigment Yellow 185.

Examples of pigments for magenta or red include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of pigments for green or cyan include C.I. Pigment Blue 15, C.I. Pigment Blue 15:2, C.I. Pigment Blue 15:3, C.I. Pigment Blue 16, C.I. Pigment Blue 60, C.I. Pigment Green 7, and siloxane-crosslinked aluminum phthalocyanine described in U.S. Pat. No. 4,311,775.

Examples of pigments for black include C.I. Pigment Black 1, C.I. Pigment Black 6 and C.I. Pigment Black 7.

When a dye is used as the color material in the invention, a dye supported on a water-insoluble carrier can be used. As the dye, known dyes may be used without particular limitation, and the dyes described in, for example, JP-A Nos. 2001-115066, 2001-335714, and 2002-249677 can be suitably used also in the invention. As the carrier, an inorganic material, an organic material, and a composite material thereof may be used without particular limitation insofar as they are insoluble in water or difficult to dissolve in water. Specifically, the carriers described in, for example, JP-A Nos. 2001-181549 and 2007-169418 can be suitably used also in the invention.

The carrier carrying a dye (color material) can be used as it is or in combination with a dispersant, as required. As the dispersant, the dispersant described below can be suitably used.

The pigments described above may be used singly, or plural pigments selected from the above pigments may be used. Regarding the pigment classes described above, when plural pigments are used, the plural pigments may belong to the same class or may belong to different classes.

The content of the color material (particularly pigment) in the ink composition is preferably from 1 to 25% by mass, more preferably from 1 to 15% by mass, and most preferably from 2 to 10% by mass, with respect to the total mass of the ink composition, from the viewpoint of color density, granularity, ink stability, and jetting reliability.

Dispersant

When the color material in the invention is a pigment, the pigment preferably forms color-material particles dispersed in an aqueous solvent by a dispersant. As the dispersant, a polymer dispersant or a low molecular-weight surfactant-type dispersant may be used. As the polymer dispersant, either of a water-soluble polymer dispersant and a water-insoluble polymer dispersant may be used.

In the invention, a water-insoluble polymer dispersant is preferable from the viewpoint of dispersion stability and jetting properties when the polymer dispersant is applied to an ink jet method.

Water-Insoluble Polymer Dispersant

As the water-insoluble polymer dispersant in the invention (hereinafter sometimes simply referred to as a "dispersant"), a known water-insoluble polymer dispersant may be used without particular limitation insofar as it is a water-insoluble polymer and can disperse a pigment. The water-insoluble polymer dispersant can contain both a hydrophobic structural unit and a hydrophilic structural unit, for example.

Examples of monomers for forming the hydrophobic structural unit include a styrene monomer, alkyl(meth)acrylate, and an aromatic group-containing (meth)acrylate.

Monomers for forming the hydrophilic structural unit are not particularly limited insofar as they are hydrophilic group-containing monomers. Examples of the hydrophilic group include a nonionic group, a carboxyl group, a sulfonic acid group, and a phosphoric acid group. Examples of a nonionic group include a hydroxyl group, an amide group (in which the nitrogen atom is not substituted), a group derived from an alkylene oxide polymer (for example, polyethylene oxide, polypropylene oxide, or the like) and a group derived from sugar alcohol.

The hydrophilic structural unit in the invention preferably contains at least a carboxyl group from the viewpoint of dispersion stability. The hydrophilic structural unit in the invention also preferably contains both a nonionic group and a carboxyl group.

Specific examples of the water-insoluble polymer dispersant in the invention include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol(meth)acrylate-(meth)acrylic acid copolymer, and a styrene-maleic acid copolymer.

Here, the "(meth)acrylic acid" refers to acrylic acid or methacrylic acid.

In the invention, the water-insoluble polymer dispersant is preferably a vinyl polymer containing a carboxyl group and more preferably a vinyl polymer having at least a structural unit derived from an aromatic group-containing monomer as the hydrophobic structural unit and having a structural unit containing a carboxyl group as the hydrophilic structural unit, from the viewpoint of the dispersion stability of the pigment.

The weight average molecular weight of the water-insoluble polymer dispersant is preferably from 3,000 to 200,000, more preferably from 5,000 to 100,000, still more preferably from 5,000 to 80,000, and particularly preferably from 10,000 to 60,000, from the viewpoint of the dispersion stability of the pigment.

The content of the dispersant in the color-material particles in the invention is preferably from 10 to 100% by mass, more preferably from 20 to 70% by mass, and particularly preferably from 30 to 50% by mass, with respect to the content of the pigment, from the viewpoint of dispersibility, ink coloring properties, and dispersion stability of the pigment.

When the content of the dispersant in the color-material particles is in the range mentioned above, the pigment is coated with a proper amount of dispersant, and thus color-material particles having a small particle diameter and excellent stability over time are apt to be obtained. Thus, the content mentioned above is preferable.

The color-material particles in the invention may contain an additional dispersant in addition to the water-insoluble polymer dispersant. For example, a known water-soluble low-molecular weight dispersant, water-soluble polymer, or the like may be used. The content of the additional dispersant other than the water-insoluble polymer dispersant can be used within the range of the content of the dispersant described above.

The color material in the invention preferably contains the pigment and the water-insoluble polymer dispersant, from the viewpoint of dispersion stability and jetting properties, and preferably has a structure in which at least a part of the surface of the pigment is coated with the water-insoluble polymer dispersant. Such a color material can be obtained as a dispersion of color-material particles by, for example, dispersing a mixture containing, a pigment and a dispersant and, as required, a solvent (preferably organic solvent), and the like with a dispersing device.

The dispersion of the color-material particles can be manufactured as a dispersion by, for example, performing a process of adding an aqueous solution containing a basic substance to a mixture of the pigment, the water-insoluble polymer dispersant, and an organic solvent that dissolves or disperses the dispersant (mixing•hydrating process), and then performing a process of removing the organic solvent (solvent removal process). Thus, the color material is finely dispersed, and a dispersion of the color-material particles exhibiting excellent storage stability can be produced.

The organic solvent needs to dissolve or disperse the dispersant and, in addition thereto, preferably has a specific degree of affinity with water. Specifically, the solubility of the organic solvent with respect to water at 20° C. is preferably from 10% by mass to 50% by mass.

More specifically, the dispersion of the color-material particles can be manufactured by a manufacturing method including the following processes (1) and (2), but the manufacturing method is not limited thereto.

Process (1): Dispersion treatment process of dispersing a mixture containing a pigment, a dispersant, an organic solvent that dissolves or disperses the dispersant, and a solution that contains a basic substance and water as a main component Process (2): Process of removing at least a part of the organic solvent from the mixture after the dispersion treatment In the process (1), first, the dispersant is dissolved or dispersed in an organic solvent, thereby obtaining a mixture (mixing process). Next, a solution containing a color material, a basic substance, and water as a main component; water; and, as required, a surfactant and the like are added to the mixture obtained above, mixed, and subjected to dispersion treatment, thereby obtaining an oil-in-water dispersion.

The basic substance is used for neutralizing an anionic group (preferably a carboxyl group) which is contained in a polymer in some cases. The degree of neutralization of the anionic group is not particularly limited. Usually, the dispersion of the color-material particles to be finally obtained has liquid properties, such as, for example, a pH of preferably from 4.5 to 10. The pH can also be adjusted in accordance with a desired degree of neutralization of the polymer.

Preferable examples of the organic solvent include an alcohol solvent, a ketone solvent, and an ether solvent. Among the above, examples of the alcohol solvent include ethanol, isopropanol, n-butanol, tertiary butanol, isobutanol, and diacetone alcohol. Examples of the ketone solvent include acetone, methyl ethyl ketone, diethyl ketone, and methyl isobutyl ketone. Examples of the ether solvent include dibutyl ether, tetrahydrofuran, and dioxane. Among the solvents, isopropanol, acetone, and methyl ethyl ketone are preferable and methyl ethyl ketone is particularly preferable. The organic solvents may be used singly or in a combination of two or more kinds thereof.

In the manufacturing of the dispersion of the color-material particles, kneading and dispersion treatment can be performed while giving strong shearing force using a two-roll mill, a three-roll mill, a ball mill, a tron mill, a disper, a kneader, a co-kneader, a homogenizer, a blender, a uniaxial or biaxial extruder, or the like. The details of kneading and dispersion are described in "Paint Flow and Pigment Dispersion" written by T. C. Patton (published by John Wiley and Sons, 1964), or the like.

As required, the dispersion of the colorant particles can be obtained by performing fine dispersion treatment using beads made of glass, zirconia, or the like having a particle diameter of from 0.01 to 1 mm by utilizing a vertical or horizontal type sand grinder, a pin mill, a slit mill, an ultrasonic dispersion device, or the like.

The removal of the organic solvent in the method for manufacturing the dispersion of color-material particles is not particularly limited and can be achieved by a known method such as distillation under reduced pressure or the like.

The color-material particles in the dispersion of the color-material particles thus obtained maintain a favorable dispersion state, and the obtained dispersion of the color-material particles exhibits excellent stability over time.

In the invention, the volume average particle diameter of the color material (or color-material particles) is preferably from 10 to 200 nm, more preferably from 10 to 150 nm, and still more preferably from 10 to 100 nm. When the volume average particle diameter is 200 nm or less, color reproduction properties become favorable and, in the case of an ink jet method, spotting properties become favorable. When the volume average particle diameter is 10 nm or more, light fastness becomes favorable.

Note that the volume average particle diameter and the particle size distribution of the color material (or color-material particles) each refer to the volume average particle diameter and the particle size distribution of pigments in the dispersion state obtained by measurement by a dynamic light scattering method using a particle size distribution measuring apparatus (MICROTRAC VERSION 10.1.2-211 BH, trade name, manufactured by NIKKISO CO., LTD.).

The particle size distribution of the color material (or color-material particles) is not particularly limited and may be either of a broad particle size distribution or a monodispersed particle size distribution. Two or more kinds of color materials each having a monodispersed particle size distribution may be mixed and used.

The volume average particle diameter and the particle size distribution of the color material (or color-material particles) can be measured using a light scattering method, for example.

In the invention, one kind of the color material (or color-material particles) may be used singly or two or more kinds thereof may be used in combination.

Water-Soluble Organic Solvent

The ink composition of the invention preferably contains at least one kind of a water-soluble organic solvent. When the water-soluble organic solvent is contained in the ink composition, effects such as dryness prevention, moistening or accelerating of penetration can be obtained. For dryness prevention, the water-soluble organic solvent is used as an anti-drying agent that prevents the formation of an aggregate due to attachment and drying of ink, which results in clogging of an ink jetting port of a jetting nozzle. For dryness prevention, or moistening, a water-soluble organic solvent having a vapor pressure lower than that of water is preferable. The water-soluble organic solvent can be used as a penetration accelerator that increases the penetration of ink into paper. Herein, the water solubility of the water-soluble organic solvent means that the organic solvent dissolves in the distilled water at 25° C. in an amount of 0.5% by mass or more with respect to distilled water. The water solubility is preferably 1% by mass or more, and more preferably 3% by mass or more.

Examples of the water-soluble organic solvent include alkanediols (polyhydric alcohols) such as glycerin, 1,2,6-hexanetriol, trimethylolpropane, ethylene glycol, and propylene glycol; sugar alcohols; and alkyl alcohols having 1 to 4 carbon atoms such as ethanol, methanol, butanol, propanol, and isopropanol; and glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-t-butyl ether, diethylene glycol mono-t-butyl ether, triethylene glycol monoethyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol, dipropylene glycol monomethyl ether, dipropylene glycol monoethyl ether, dipropylene glycol mono-n-propyl ether, dipropylene glycol mono-isopropyl ether, and tripropylene glycol monomethyl ether. These may be used singly, or two or more thereof may be used in combination.

For the purpose of drying prevention or moistening, polyhydric alcohols are useful, and examples thereof include glycerin, ethylene glycol, diethylene glycol, triethylene glycol, propylene glycol, dipropylene glycol, tripropylene glycol, 1,3-butanediol, and 2,3-butanediol. These may be used singly, or two or more thereof may be used in combination.

For the purpose of accelerating penetration, polyol compounds are preferable, and aliphatic diols are favorable. Examples of aliphatic diols include 2-ethyl-2-methyl-1,3-propanediol, 3,3-dimethyl-1,2-butanediol, 2,2-diethyl-1,3-propanediol, 2-ethyl-1,3-hexanediol, and 2,2,4-trimethyl-1,3-pentanediol. Among these, 2-ethyl-1,3-hexanediol and 2,2,4-trimethyl-1,3-pentanediol are preferable.

The ink composition preferably contains at least one compound represented by the following Structural Formula (1) as the water-soluble organic solvent of the invention, from the viewpoint of suppressing the occurrence of curling of the recording medium.

Structural Formula (1)

In Structural Formula (1), l, m, and n each independently represent an integer of 1 or more and satisfy l+m+n=3 to 15, in which the range of l+m+n is preferably from 3 to 12 and more preferably from 3 to 10. When the value of l+m+n is 3 or more, the curl suppression properties are favorable, and when the value of l+m+n is 15 or less, favorable jetting properties are obtained. In Structural Formula (1), AO represents at least either one of ethyleneoxy (EO) and propyleneoxy (PO), and particularly a propyleneoxy group is preferable. Each AO in $(AO)_l$, $(AO)_m$, and $(AO)_n$ above may be the same or different from each other.

Hereinafter, examples of the compound represented by Structural Formula (1) are shown. However, the invention is not limited thereto. In the exemplified compounds shown below, the description "POP(3) glyceryl ether" refers to glyceryl ether in which three propyleneoxy groups are bonded to glycerin in total, and so are the other descriptions.

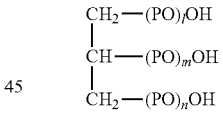

l+m+n=3 POP (3) glyceryl ether
l+m+n=4 POP (4) glyceryl ether
l+m+n=5 POP (5) glyceryl ether
l+m+n=6 POP (6) glyceryl ether
l+m+n=7 POP (7) glyceryl ether The water-soluble organic solvent in the invention is also preferably a water-soluble organic solvent shown below in terms of suppressing the occurrence of curling on a recording medium.

n-$C_4H_9O(AO)_4$—H (AO=EO or PO, Ratio: EO:PO=1:1)
n-$C_4H_9O(AO)_{10}$—H (AO=EO or PO, Ratio: EO:PO=1:1)
HO $(AO)_{40}$—H (AO=EO or PO, Ratio: EO:PO=1:3)
HO $(AO)_{55}$—H (AO=EO or PO, Ratio: EO:PO=5:6)
HO$(PO)_3$—H
HO$(PO)_7$—H
1,2-hexanediol The content of the compound represented by Structural Formula (1) and the exemplified compounds in the total of the water-soluble organic solvent is preferably 3% by mass or more, more preferably 4% by mass or more, and still more preferably 5% by mass or more, with respect to the total of the water-soluble organic solvent. By adjusting the content in the range above, curling can be suppressed without deteriorating the stability or jetting properties of ink. Thus, the range is preferable.

In the invention, the water-soluble organic solvents may be used alone or as a mixture of two or more kinds thereof.

The content of the water-soluble organic solvent in the ink composition is preferably from 1% by mass to 60% by mass and more preferably from 5% by mass to 40% by mass, with respect to the ink composition.

Resin Particles

The ink composition of the invention preferably contains at least one kind of resin particles. When the ink composition contains the resin particles, fixability of the ink composition to a recording medium, scratch resistance of an image, and blocking resistance can be effectively improved.

The resin particles preferably have a function of fixing the ink composition, that is, an image, by increasing the viscosity of ink by aggregation or dispersion-destabilization when the resin particles contact the above-described treatment liquid or a region on a recording medium at which the treatment liquid has been applied and dried. Such resin particles are preferably dispersed in at least one selected from water or an organic solvent.

Examples of resin particles in the invention include acrylic resin, vinyl acetate resin, styrene-butadiene resin, vinyl chloride resin, acrylic-styrene resin, butadiene resin, styrene resin, crosslinked acrylic resin, crosslinked styrene resin, benzoguanamine resin, phenol resin, silicone resin, epoxy resin, urethane resin, paraffin resin, and fluororesin or a latex thereof. Preferable examples include acrylic resin, acrylic-styrene resin, styrene resin, crosslinked acrylic resin, and crosslinked styrene resin.

The resin particles may also be used in the form of latex.

The weight average molecular weight of the resin particles is preferably from 10,000 to 200,000 and more preferably from 100,000 to 200,000.

The volume average particle diameter of the resin particles is preferably in a range of from 10 nm to 1 μm, more preferably in a range of from 10 to 200 nm, still more preferably in a range of from 20 to 100 nm, and particularly preferably in a range of from 20 to 50 nm.

The glass transition temperature Tg of the resin particles is preferably 30° C. or more, more preferably 40° C. or more, and still more preferably 50° C. or more.

The addition amount of the resin particles is preferably from 0.1 to 20% by mass, and more preferably from 0.1 to 15% by mass, with respect to the ink.

The particle size distribution of the resin particles is not particularly limited and may be any of a broad particle size distribution or a monodispersed particle size distribution. Two or more kinds of resin particles each having a monodispersed particle size distribution may be mixed for use.

Surfactant

The ink composition according to the present invention may contain at least one surfactant, if necessary. The surfactant may be used as a surface-tension controller.

Examples of surface-tension controllers to be used effectively include a compound having a structure that has both a hydrophilic unit and a hydrophobic unit in a molecule thereof, and any of an anionic surfactant, a cationic surfactant, an amphoteric surfactant, a nonionic surfactant, or a betaine surfactant may be used. The dispersant (polymeric dispersant) described above may be used as a surfactant.

In the present invention, nonionic surfactants are preferable, and among nonionic surfactants, acetylene glycol derivatives are more preferable, from the viewpoint of preventing spotting interference of an ink.

When the ink composition contains a surfactant (surface-tension controller), the content of the surfactant is preferably such an amount that the surface tension of the ink composition is adjusted to be from 20 to 60 mN/m, in view of favorably performing jetting of the ink composition by an inkjet method. The surface tension of the ink composition is more preferably from 20 to 45 mN/m, and even more preferably from 25 to 40 mN/m.

The specific amount of surfactant in the ink composition is not particularly limited, and is preferably such an amount as to achieve the surface tension of the ink in a preferable range as described above. The amount of surfactant is preferably 1% by mass or more, more preferably from 1 to 10% by mass, and even more preferably from 1 to 3% by mass, with respect to the ink composition.

Other Ingredients

The ink composition may further contain various additives as other ingredients as required, in addition to the ingredients described above.

Examples of the various additives include known additives such as an ultraviolet absorber, a discoloration inhibitor, an antifungal agent, a pH adjuster, an antirust agent, an antioxidant, an emulsion stabilizer, an antiseptic, a defoaming agent, a viscosity adjuster, a dispersion stabilizer, a chelate agent, and a solid moistening agent.

Examples of the ultraviolet absorber include benzophenone ultraviolet absorbers, benzotriazole ultraviolet absorbers, salicylate ultraviolet absorbers, cyanoacrylate ultraviolet absorbers, and nickel complex salt ultraviolet absorbers.

As the discoloration inhibitor, any one of various organic and metal complex discoloration inhibitors may be used. Examples of organic discoloration inhibitors include hydroquinones, alkoxyphenols, dialkoxyphenols, phenols, anilines, amines, indanes, chromanes, alkoxyanilines, and hetero rings, and examples of metal complex discoloration inhibitors include nickel complexes and zinc complexes.

Examples of the antifungal agent include sodium dehydroacetate, sodium benzoate, sodium pyridinethion-1-oxide, ethyl p-hydroxybenzoic acid ester, 1,2-benzisothiazolin-3-on, sodium sorbate, and sodium pentachlorophenol.

The antifungal agent is preferably contained in the ink composition in an amount of from 0.02 to 1.00% by mass with respect to the ink composition.

As the pH adjuster, any pH adjuster may be suitably selected according to the purpose without particular limitation insofar as the pH can be adjusted to a desired value without adversely affecting the ink composition to be prepared. Examples thereof include alcohol amines (for example, diethanolamine, triethanolamine, 2-amino-2-ethyl-1,3-propanediol and the like), alkali metal hydroxides (for example, lithium hydroxide, sodium hydroxide, potassium hydroxide, and the like), ammonium hydroxides (for example, ammonium hydroxide, quaternary ammonium hydroxide, and the like), phosphonium hydroxide, and alkaline metal carbonate.

Examples of the antirust agent include acidic sulfite, sodium thiosulfate, ammonium thiodiglycolate, diisopropyl ammonium nitrite, pentaerythritol tetranitrate, and dicyclohexyl ammonium nitrite.

Examples of the antioxidant include phenol antioxidants (including hindered phenol antioxidants), amine antioxidants, sulfur-containing antioxidants, and phosphorous-containing antioxidants.

Examples of the chelate agent include sodium ethylene diamine tetraacetate, sodium nitrilotriacetate, sodium hydroxyethyl ethylene diamine triacetate, sodium diethylene triamine pentaacetate, and sodium uramil diacetate.

Physical Properties of Ink Composition

In the present invention, a surface tension (at 25° C.) of the ink composition is preferably from 20 mN/m to 60 mN/m, more preferably from 20 mN/m to 45 mN/m, and still more preferably from 25 mN/m to 40 mN/m.

The surface tension is a value obtained by measuring the surface tension of an ink composition at 25° C. using an Automatic Surface Tensiometer CBVP-Z (trade name, manufactured by Kyowa Interface Science Co., Ltd.).

The viscosity at 25° C. of the ink composition according to the present invention is preferably from 1.2 mPa·s to 15.0 mPa·s, more preferably from 2 mPa·s to less than 13 mPa·s, and still more preferably from 2.5 mPa·s to less than 10 mPa·s.

The viscosity is a value obtained by measuring the viscosity of an ink composition at 25° C. using VISCOMETER TV-22 (trade name, manufactured by Toki Sangyo Co., Ltd.).

Ink Set

The ink set of the invention contains at least one kind of the ink composition described above and at least one kind of a treatment liquid containing an aggregating agent capable of forming an aggregate when the aggregating agent contacts the ink composition.

By forming an image by utilizing the ink composition containing the compound having a structure represented by the above Formula (I) and the polymerization initiator, and the treatment liquid containing an aggregating agent, an image exhibiting a favorable image quality and having high curing sensitivity is formed.

Treatment Liquid

In the ink set of the invention, the treatment liquid contains at least one kind of an aggregating agent capable of forming an aggregate when the aggregating agent contacts the ink composition and, as required, other components.

When the treatment liquid contains the aggregating agent, an image exhibiting favorable image quality and the like can be formed.

Aggregating Agent

The treatment liquid in the invention contains an aggregating agent that aggregates a component in the ink composition. The aggregating agent in the invention can aggregate (fix) the ink composition when contacting the ink composition on a recording medium, and functions as a fixing agent. For example, in a state in which the aggregating agent is present on a recording medium (preferably coated paper) by applying the treatment liquid to the recording medium, droplets of the ink composition are applied and contact the aggregating agent, and thus a component in the ink composition aggregates, and the component in the ink composition can be fixed on the recording medium.

Examples of a component in the treatment liquid for fixing a component in the ink composition include an acidic compound, a polyvalent metal salt, and a cationic polymer. These may be used singly or in a combination of two or more kinds thereof.

Acidic Compound

Preferable examples of the acidic compound include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, and salts thereof.

Among the above, an acidic compound having high water solubility is preferable. From the viewpoint of reacting with the ink composition to fix the entire ink, a trivalent or lower valent acidic compound is preferable, and a divalent to trivalent acidic compound is particularly preferable.

The acidic compounds may be used singly or in a combination of two or more kinds thereof.

When the treatment liquid contains the acidic compound, the pH (25° C.) of the treatment liquid is preferably from 0.1 to 6.8, more preferably from 0.5 to 6.0, and still more preferably from 0.8 to 5.0.

The content of the acidic compound is preferably 40% by mass or less and more preferably from 15 to 40% by mass, with respect to the total mass of the treatment liquid. By adjusting the content of the acidic compound to the range of from 15 to 40% by mass, the components in the ink composition can be more efficiently fixed.

The content of the acidic compound is preferably from 15% by mass to 35% by mass and more preferably from 20% by mass to 30% by mass, with respect to the total mass of the treatment liquid.

The application amount of the acidic compound to the recording medium is not particularly limited insofar as the amount is sufficient for aggregating the ink composition. From the viewpoint of ease of fixation of the ink composition, the application amount is preferably from 0.5 g/m$^2$ to 4.0 g/m$^2$ and more preferably from 0.9 g/m$^2$ to 3.75 g/m$^2$.

Polyvalent Metal Salt

The polyvalent metal salt in the invention is a compound containing a divalent or higher valent metal such as an alkaline earth metal, a zinc group metal, or the like.

In the invention, the aggregation reaction of the ink composition when the ink composition is jetted to a recording medium (preferably coated paper) to which the treatment liquid containing the polyvalent metal salt has been applied can be achieved by reducing dispersion stability of the particles dispersed in the ink composition such as, for example, particles such as a color material represented by a pigment, resin particles or the like, and increasing the viscosity of the entire ink composition. For example, when the particles such as the pigment, resin particles or the like in the ink composition have a weak acidic functional group such as a carboxyl group or the like, the particles are stably dispersed due to the action of the weak acidic functional group, but the surface charge of the particles is reduced by interaction with the polyvalent metal salt, whereby dispersion stability can be decreased. Accordingly, from the viewpoint of the aggregation reaction, the polyvalent metal salt serving as a fixing agent contained in the treatment liquid needs to be divalent or higher valent, that is, polyvalent, and, from the viewpoint of the aggregation reactivity, the polyvalent metal salt is preferably a polyvalent metal salt containing a trivalent or higher valent metal ion.

From the viewpoints described above, the polyvalent metal salt usable in the treatment liquid in the invention is preferably at least any one of a salt of a polyvalent metal ion and a negative ion described below, polyaluminum hydroxide, or polyaluminum chloride.

Examples of the polyvalent metal ion include $Ca^{2+}$, $Cu^{2+}$, $Ni^{2+}$, $Mg^{2+}$, $Sr^{2+}$, $Zn^{2+}$, $Ba^{2+}$, $Al^{2+}$, $Fe^{3+}$, $Cr^{3+}$, $Co^{3+}$, $Fe^{2+}$, $La^{3+}$, $Nd^{3+}$, $Y^{3+}$, and $Zr^{4+}$. In order for the treatment liquid to contain the polyvalent metal ion, a salt of the polyvalent metal may be used.

The salt refers to a metal salt containing the polyvalent metal ion described above and a negative ion to be bonded to the polyvalent metal ion, and is preferably soluble in a solvent. Here, the solvent refers to a medium forming a part of the treatment liquid with the polyvalent metal salt and examples include water or an organic solvent as described above.

Examples of a preferable negative ion for forming a salt with the polyvalent metal ion include $Cl^-$, $NO_3^-$, $I^-$, $Br^-$, $ClO_3^-$, $CH_3COO^-$, and $SO_4^{2-}$.

The polyvalent metal ion and the negative ion may form a salt of the polyvalent metal ion and the negative ion using the polyvalent metal ion and the negative ion singly or in a combination of two or more kinds thereof.

Examples of the polyvalent metal salt other than the above include polyaluminum hydroxide and polyaluminum chloride.

In the invention, in terms of reactivity or coloring properties, ease in handling and the like, the salt of the polyvalent metal ion and the negative ion is preferably used. As the polyvalent metal ion, at least one selected from $Ca^{2+}$, $Mg^{2+}$, $Sr^{2+}$, $Al^{3+}$, and $Y^{3+}$ is preferable and $Ca^{2+}$ is more preferable.

As the negative ion, $NO_3^-$ is particularly preferable from the viewpoint of solubility or the like.

The polyvalent metal salt may be used alone or as a mixture of two or more kinds thereof.

The content of the polyvalent metal salt may be 15% by mass or more with respect to the total mass of the treatment liquid. By adjusting the content of the polyvalent metal salt to 15% by mass or more, the components in the ink composition can be more effectively fixed.

The content of the polyvalent metal salt is preferably from 15% by mass to 35% by mass and more preferably from 20% by mass to 30% by mass with respect to the total mass of the treatment liquid.

The application amount of the polyvalent metal salt to a recording medium is not particularly limited insofar as the amount is sufficient for aggregating the ink composition. From the viewpoint of ease in fixation of the ink composition, the amount is preferably from 0.5 $g/m^2$ to 4.0 $g/m^2$ and more preferably from 0.9 $g/m^2$ to 3.75 $g/m^2$.

Cationic Polymer

Examples of cationic polymers include at least one kind of cationic polymer selected from a salt of poly(vinylpyridine), polyalkylaminoethyl acrylate, polyaklylaminoethyl methacrylate, poly(vinylimidazole), polyethyleneimine, polybiguanide, and polyguanide.

The cationic polymers may be used singly or in a combination of two or more kinds thereof.

Among the cationic polymers, polyguanide (preferably poly(hexamethylene guanidine)acetate, polymonoguanide, and polymeric biguanide), polyethyleneimine, and poly(vinylpyridine) are preferable because they are advantageous from the viewpoint of aggregation rate.

The smaller weight average molecular weight of the cationic polymer is preferable in terms of the viscosity of the treatment liquid. When the treatment liquid is applied to a recording medium by an inkjet method, the weight average molecular weight is preferably in a range of from 500 to 500,000, more preferably in a range of from 700 to 200,000, and still more preferably in a range of from 1,000 to 100,000. The weight average molecular weight of 500 or more has advantage in the aggregation rate and the weight average molecular weight of 500,000 or less has advantage in jetting reliability. However, the same does not necessarily apply to the case where the treatment liquid is applied to a recording medium by methods other than the ink jet method.

When the treatment liquid contains the cationic polymer, pH (25° C.) of the treatment liquid is preferably from 1.0 to 10.0, more preferably from 2.0 to 9.0, and still more preferably from 3.0 to 7.0.

The content of the cationic polymer is preferably from 1% by mass to 35% by mass and more preferably from 5% by mass to 25% by mass with respect to the total mass of the treatment liquid.

The application amount of the cationic polymer to a coated paper is not particularly limited insofar as the amount is sufficient for aggregating the ink composition. From the viewpoint of ease in fixation of the ink composition, the application amount is preferably from 0.5 $g/m^2$ to 4.0 $g/m^2$ and more preferably from 0.9 $g/m^2$ to 3.75 $g/m^2$.

Image Forming Method

An image forming method of the invention includes at least a treatment liquid application process of applying the treatment liquid contained in the ink set onto a recording medium and an ink application process of applying the ink composition contained in the ink set onto the recording medium to form an image and may include, as required, other processes.

Recording Medium

A recording medium to be used in the image forming method of the present invention is not particularly limited, and may be a general printing paper containing cellulose as the major component such as a high-quality paper, a coat paper, or an art paper, which is used for general offset printing and the like. When image recording is performed on the general printing paper containing cellulose as the major component by a general ink jet method using an ink, absorption and drying of the ink is relatively slow, and color material migration tends to occur after jetting ink droplets, whereby image quality is apt to degrade. In contrast, when image recording is conducted by the ink jet recording method according to the present invention, a high-grade image recording having excellent color density and hue can be achieved while suppressing the color material migration.

The recording medium may be a commercially-available product, and examples thereof include high-quality papers (A) such as PRINCE WOOD FREE (trade name) manufactured by Oji Paper Co., Ltd., SHIRAOI (trade name) manufactured by Nippon Paper Industries Co., Ltd., and New NPI jo-shitsu (New NPI high-quality; trade name) manufactured by Nippon Paper Industries Co., Ltd.; high-quality coat papers such as SILVER DIA and U-LITE (trade names) manufactured by Nippon Paper Industries Co., Ltd.; very light-weight coated papers such as EVER LIGHT COATED (trade name) manufactured by Oji Paper Co., Ltd. and AURORA S (trade name) manufactured by Nippon Paper Industries Co., Ltd.; lightweight coat papers (A3) such as TOPKOTE (L) (trade name) manufactured by Oji Paper Co., Ltd. and AURORA L (trade name) manufactured by Nippon Paper Industries Co., Ltd.; coat papers (A2, B2) such as TOPKOTE PLUS (trade name) manufactured by Oji Paper Co., Ltd. and AURORA COAT (tradename) manufactured by Nippon Paper Industries Co., Ltd.; and art papers (A1) such as KINFUJI (2/SIDE GOLDEN CASK GLOSS) (trade name) manufactured by Oji Paper Co., Ltd. and TOKUBISHI ART (tradename) manufactured by Mitsubishi Paper Mills Ltd. As the recording medium, various inkjet-recording papers exclusively for photos may be used.

Among the above, from the viewpoints of obtaining a significant effect in terms of suppressing color material migration and obtaining a high-quality image having more favorable color density and hue than conventionally, a recording medium having a water absorption coefficient Ka of from 0.05 to 0.5 $mL/m^2 \cdot ms^{1/2}$ is preferable, a recording medium having a water absorption coefficient Ka of from 0.1 to 0.4 $mL/m^2 \cdot ms^{1/2}$ is more preferable, and a recording medium having a water absorption coefficient Ka of from 0.2 to 0.3 $mL/m^2 \cdot ms^{1/2}$ is still more preferable.

The water absorption coefficient Ka has the same definition as those described in JAPAN TAPPI Pulp and Paper Testing Method No. 51: 2000 (published by JAPAN TAPPI), and, specifically, the water absorption coefficient Ka is calculated from a difference between the transfer amount of water at a contact time of 100 ms and the transfer amount of water at a contact time of 900 ms, measured using an automatic scanning liquid absorptometer KM500Win (trade name, manufactured by Kumagairiki Riki Kogyo Co., Ltd.).

Among the recording media, a so-called coated paper for use in general offset printing is preferable. The coated paper is obtained by applying a coating material to the surface of high-quality paper, neutralized paper or the like which contains cellulose as the major component and has not been generally treated on the surface thereof to form a coating layer thereon. In image forming by usual ink-jetting, the coated paper is likely to cause problems in quality, such as problems in image glossiness or scratch resistance. However, in the ink jet recording method of the invention, uneven glossiness is suppressed, and an image having favorable glossiness and scratch resistance can be obtained. In particular, coated paper having a base paper and a coating layer containing kaolin and/or calcium bicarbonate is preferably used. More specifically, art paper, coat paper, lightweight coat paper, or lightweight coated paper is more preferable.

Treatment Liquid Application Process

In the treatment liquid application process, a treatment liquid which is contained in the ink set, contains an aggregating agent, and may contain an acid generating agent is applied onto a recording medium. For the application of the treatment liquid to the recording medium, known liquid application methods may be used without particular limitation, and an arbitrary method such as coating (for example, spray coating, coating with a coating roller, or the like), application by an ink jet method, or immersion may be selected.

Specific examples include a size press method such as a horizontal size press method, a roll coater method, or a calendar size press method; a knife coater method such as an air knife coater method; a roll coater method such as a transfer roll coater method (for example, a gate roll coater method), a direct roll coater method, a reverse roll coater method, or a squeeze roll coater method; a blade coater method such as a billblade coater method, a short dwell coater method, or a two stream coater method; a bar coater method such as a rod bar coater method; a cast coater method; a gravure coater method; a curtain coater method; a die coater method; a brush coater method; and a transfer method.

Furthermore, a method in which coating is performed while adjusting the coating amount by using a coating apparatus equipped with a liquid amount controlling member may be used, as in the case of the coating apparatus described in JP-A No. 10-230201.

Regarding the region to be applied with the treatment liquid, a whole-surface application may be performed in which the treatment liquid is applied over an entire one surface of the recording medium (for example, coated paper), or a partial application may be performed in which the treatment liquid is selectively applied to a region at which inkjet recording is to be performed in the subsequent ink application process. According to the invention, a whole-surface application of the treatment liquid in which the treatment liquid is applied over an entire one surface of the recording medium by coating using a coating roller or the like is preferable in view of adjusting the application amount of the treatment liquid to be uniform, achieving recording of uniform fine lines, uniform fine image portions or the like, and suppressing density unevenness such as image unevenness.

Examples of a method of applying the treatment liquid while adjusting the application amount of the treatment liquid to the range described above include a method of using an anilox roller. The anilox roller is a roller having depressed portions in a certain shape such as a pyramidal form, an oblique line form, or testudinal form, which are formed by laser-processing the roller surface that has been thermally sprayed with ceramic. When the treatment liquid enters the depressed portions provided on the roller surface, and is transferred to paper surface when coming into contact with a surface of the paper, whereby the treatment liquid is applied in an application amount that is adjusted by the depressions of the anilox roller.

Ink Application Process

In the ink application process in the invention, the ink composition that is included in the ink set and contains the color material, the polymerizable compound, the initiator, and the aqueous medium is applied onto the recording medium. As a method of applying the ink composition, a known ink application method may be used without particular limitation insofar as the ink composition can be applied in the shape of a desired image. Examples thereof include a method of applying the ink composition onto the recording medium by way of an ink jet system, a copying system, or a stamping and transfer system. In particular, from the viewpoint of reducing the size of a recording device and achieving high-speed recording properties, a process of applying the ink composition by an ink-jet method is preferable.

Ink-Jet Method

In the image formation by an ink jet method, the ink composition is jetted onto a recording medium by applying energy, whereby a colored image is formed. As an ink-jet recording method suitable for the invention, the method described in Paragraphs [0093] to [0105] of JP-A No. 2003-306623 can be applied.

The ink jet method is not particularly limited and may be any known method such as a charge-control method in which ink is jetted by electrostatic attraction force; a drop-on-demand method (pressure pulse method) in which a pressure of oscillation of piezo element is utilized; and an acoustic ink jet method in which ink is jetted by radiation pressure generated by irradiation of ink with acoustic beams that have been converted from electric signals.

The ink jet head for use in the ink jet method may be an on-demand type head or a continuous type head. The ink nozzles used for the ink-jet recording are not particularly limited and may be selected appropriate according to the purpose.

Examples of the ink-jet method include a method in which a large number of small-volume droplets of ink having a low optical density, which is called a photo ink, are jetted; a method in which inks of substantially the same color hue at different densities are used to improve image quality; and a method in which a clear and colorless ink is used.

Regarding the inkjet recording head, there are (i) a shuttle system in which recording is performed while a short serial head having a small length is moved in the width direction of a recording medium in a scanning manner, and (ii) a line system in which a line head having recording devices that are aligned correspondingly to the entire length of one side of a recording medium is used. In the line system, image recording can be performed over the whole of one surface of a recording medium by moving the recording medium in a direction orthogonal to the direction along which the recording devices are aligned, and a conveyance system, such as carriage or the like, which moves the short head in a scanning manner is unnecessary. Since a complicated scan-movement control of the movement of the carriage and the recording medium is unnecessary and only the recording medium is moved, the recording speed can be increased compared to the shuttle system.

In the invention, although the ordering of performing the treatment liquid application process and the ink application process is not particularly limited, an embodiment in which the ink application process is performed after the treatment liquid application process is preferable from the viewpoint of image quality. More specifically, the ink application process is preferably a process of applying the ink composition onto a recording medium to which the treatment liquid has been applied.

Active Energy Ray Irradiation Process

The scope of the image forming method of the invention preferably includes a process of irradiating the ink composition applied onto the recording medium with an active energy ray. By performing irradiation of an active energy ray, the polymerizable compound contained in the ink composition polymerizes to form a cured film containing the color material. Thus, the scratch resistance and blocking resistance of the image are more effectively improved.

The ink composition applied onto the recording medium is cured by irradiation of an active energy ray. This is because the initiator contained in the ink composition of the invention decomposes due to the irradiation of the active energy ray to generate initiation species such as a radical, an acid, and a base, and the initiation species initiate and promote the polymerization reaction of the polymerizable compound, whereby the ink composition is cured.

The ink composition is further aggregated (fixed) due to an acid supplied from the acid generating agent contained in the treatment liquid during the irradiation of the active energy ray, whereby the quality of image portions (scratch resistance, blocking resistance, and the like) is improved.

Here, examples of the active energy ray to be used include α rays, γ rays, electron beams, X-rays, ultraviolet rays, visible light, and infrared light. The wavelength of the active energy ray is preferably from 200 to 600 nm, more preferably from 300 to 450 nm, and still more preferably from 350 to 420 nm, for example.

The output of active radiation is preferably 5000 mJ/cm$^2$ or less, more preferably from 10 to 4000 mJ/cm$^2$, and still more preferably from 20 to 3000 mJ/cm$^2$.

As a source of the active energy ray, a mercury lamp, a gas•solid laser, and the like are mainly utilized. As a light source to be used for curing an ultraviolet-ray curing ink jet recording ink, a mercury lamp and a metal halide lamp are widely known. However, there is a strong need for mercury-free devices from the viewpoint of the current environmental protection, and the substitution with a GaN semiconductor ultraviolet ray-emitting device is very useful from the industrial and environmental standpoints. LEDs (UV-LEDs) and LDs (UV-LDs) have a small size, a long lifetime, a high efficiency, and a low cost and thus are attracting attention as light sources for photocuring ink jet.

A light-emitting diode (LED) and a laser diode (LD) can be used as the active radiation source. In particular, an ultraviolet LED or an ultraviolet LD can be used when an ultraviolet ray source is required. For example, a purple LED in which the main emission spectrum has a wavelength between 365 nm and 420 nm is commercially available from Nichia Corporation.

Particularly, a preferable active energy ray source in the invention is a UV-LED, and a UV-LED having a peak wavelength within a range of from 350 to 420 nm is particularly preferable.

Ink Drying Process

The scope of the image forming method of the invention may include an ink drying process of drying and removing an ink solvent (for example, water, the water-soluble organic solvent, or the like) contained in the ink composition applied onto the recording medium, as required. As the ink drying process, a generally used method may be applied without particular limitation insofar as at least a part of the ink solvent can be removed.

For example, the drying of ink may be performed with a known heating means such as a heater, or an air-blowing means utilizing blowing of air such as a drier, or a means having a combination thereof. Examples of the heating method include: a method of supplying heat from the side of the recording medium opposite to the surface onto which the treatment liquid has been applied, using a heater or the like; a method of blowing a warm or hot air to the surface of the recording medium onto which the treatment liquid has been applied; a heating method using an infrared heater; and a combination of two or more of the above methods.

The ink drying process may be performed before or after the active energy ray irradiation process, insofar as it is performed after the ink application process. In the invention, the ink drying process is preferably performed before the active energy ray irradiation process from the viewpoint of curing sensitivity and blocking resistance.

EXAMPLES

Hereinafter, the invention is specifically described with reference to Examples but is not limited to the Examples. Unless otherwise specified, "part(s)" and "%" are all based on mass.

Synthesis of Compound Represented by Formula (I)
(Synthesis of Compound 1 Represented by Formula (I))

To a 1 L three-necked flask provided with a stirrer, 75.0 g of poly(styrene-maleic anhydride) copolymer (a product of Sigma-Aldrich Corporation, Mn=1600) and 675.0 g of N-methylpyrrolidinone (NMP) were added, and heated at 60° C. while being stirred to dissolve the content of the 1-L three-necked flask. Next, to the 1-L three-necked flask, 93.0 g of hydroxyethyl acrylamide and 9.0 g of dimethylaminopyridine (DMAP) were added and allowed to react at 60° C. for 2 hours. The obtained reaction mixture was added dropwise to isopropyl alcohol (IPA)/hexane (4.5 L/3.8 L), and the obtained solid was collected by filtration. Further, the solid was dissolved in 400 ml of methanol, the mixture solution was added dropwise to isopropyl alcohol (IPA)/hexane (4.5 L/3.8 L), and the obtained solid was collected by filtration, whereby 73.5 g of white powder was obtained. Next, the obtained white powder was mixed with 100.2 g of water, and a 2 M sodium hydroxide aqueous solution was added thereto while carrying out stirring at 45° C. so as to adjust the pH to 8.5. Water was added to the obtained aqueous solution to adjust the solid content to 22.0%, thereby obtaining about 300 g of aqueous solution (solid content 22.0%) of the target Compound 1 represented by Formula (I). The Compound 1 represented by Formula (I) is shown below.

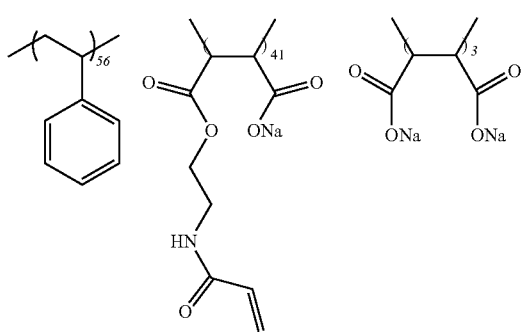

(Synthesis of Compound 2 Represented by Formula (I))

About 300 g of an aqueous solution (solid content 22.0%) of Compound 2 represented by Formula (I) (Mn=6000) was obtained in the same manner as in synthesis of the Compound 1 represented by Formula (I), except that neutralization was performed with a 2 M aqueous solution of potassium hydroxide. The Compound 2 represented by Formula (I) is shown below.

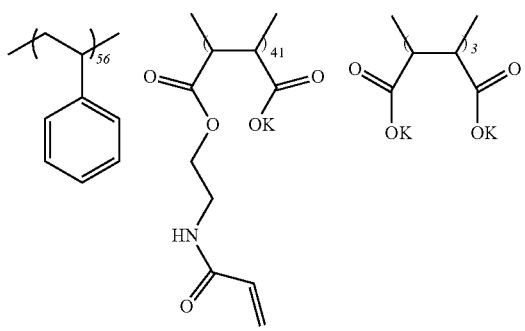

(Synthesis of Compound 4 Represented by Formula (I))

About 300 g of an aqueous solution (solid content 22.0%) of Compound 4 represented by Formula (I) (Mn=4000) was obtained in the same manner as in synthesis of represented by Formula (I) (Mn=4000) was obtained in the same manner as in synthesis of the Compound 1 represented by Formula (I), except that 23.6 g of hydroxyethylacrylamide and 2.6 g of dimethylaminopyridine (DMAP) were used. The Compound 4 represented by Formula (I) is shown below.

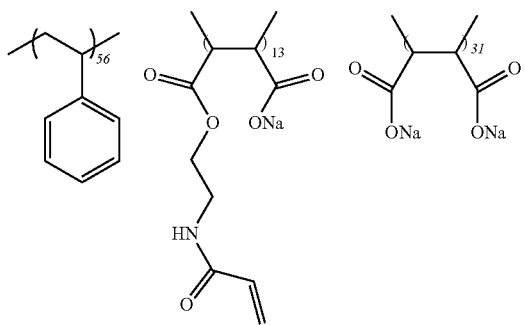

(Synthesis of Compound 6 Represented by Formula (I))

About 300 g of an aqueous solution (solid content 22.0%) of Compound 6 represented by Formula (I) (Mn=5,800) was obtained in the same manner as in synthesis of the Compound 1 represented by Formula (I), except that hydroxymethylacrylamide was used in place of hydroxyethylacrylamide. The Compound 6 represented by Formula (I) is shown below.

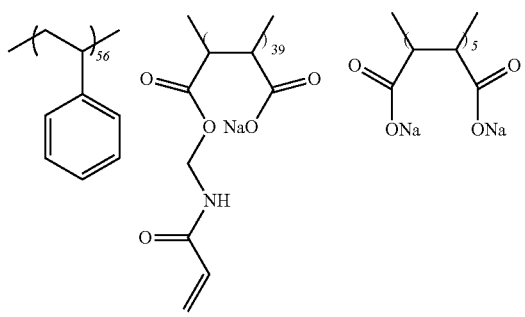

(Synthesis of Compound 8 Represented by Formula (I))

About 300 g of an aqueous solution (solid content 22.0%) of Compound 8 represented by Formula (I) (Mn=6,400) was obtained in the same manner as in synthesis of the Compound 1 represented by Formula (I), except that hydroxypropylacrylamide was used in place of hydroxyethylacrylamide. The Compound 8 represented by Formula (I) is shown below.

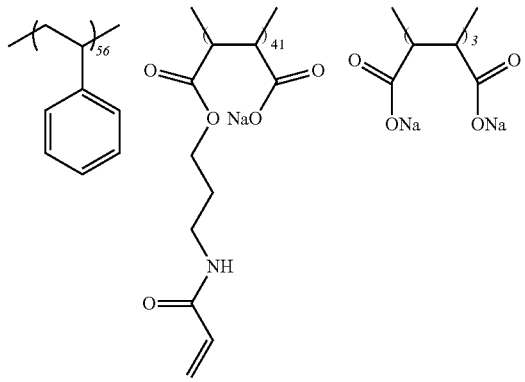

(Synthesis of Compound 13 Represented by Formula (I))

About 300 g of an aqueous solution (solid content 22.0%) of Compound 13 represented by Formula (I) (Mn=15,000) was obtained in the same manner as in synthesis of the Compound 1 represented by Formula (I), except that (1-octadecene-maleic anhydride) copolymer (a product of Polysciences Inc.) was used in place of (styrene-maleic anhydride) copolymer. The Compound 13 represented by Formula (I) is shown below.

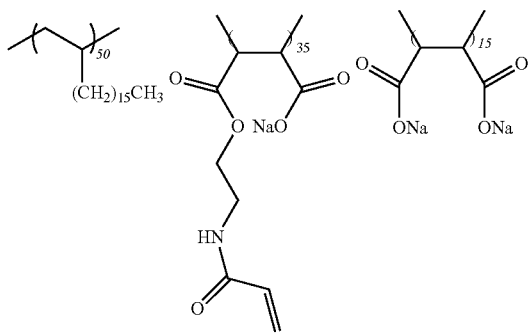

(Synthesis of Compound 15 Represented by Formula (I))

About 300 g of an aqueous solution (solid content 22.0%) of Compound 15 represented by Formula (I) (Mn=6,000) was obtained in the same manner as in synthesis of the Compound 1 represented by Formula (I), except that hydroxyethylacrylate was used in place of hydroxyethylacrylamide. The compound 15 represented by Formula (I) is shown below.

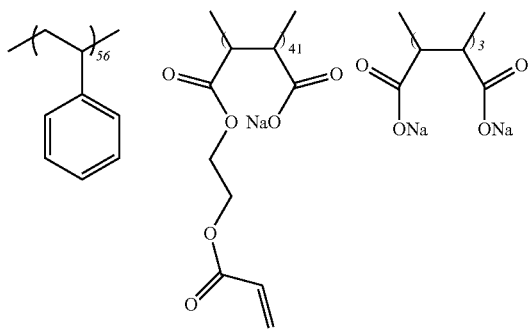

(Synthesis of Compound 17 Represented by Formula (I))

2-aminoethylacrylate was synthesized in accordance with a method described in Zhurnal Organicheskoi Khimii, 1969, vol. 5, #2 p. 254-262, 244-251.

About 300 g of an aqueous solution (solid content 22.0%) of Compound 17 represented by Formula (I) (Mn=6,000) was obtained in the same manner as in synthesis of the Compound 1 represented by Formula (I), except that 2-aminoethylacrylate was used in place of hydroxyethylacrylamide. The Compound 17 represented by Formula (I) is shown below.

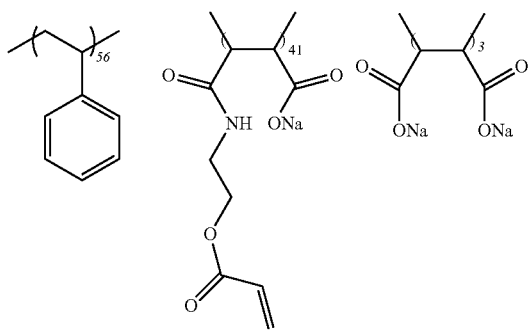

Synthesis of Comparative Compound
(Synthesis of Comparative Compound 1)

Comparative compound 1 having the following structure was synthesized in accordance with a synthetic method described in JP-A No. 2009-221281.

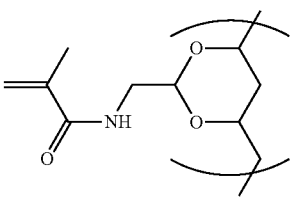

Synthesis of Polymer Dispersant P-1

To a 1000 ml three-necked flask equipped with a stirrer and a condenser tube, 88 g of methyl ethyl ketone was added, and heated to 72° C. under a nitrogen atmosphere. To the flask, a solution in which 0.85 g of dimethyl-2,2-azobisisobutyrate, 60 g of benzyl methacrylate, 10 g of methacrylic acid, and 30 g of methyl methacrylate were dissolved in 50 g of methyl ethyl ketone was added dropwise over 3 hours. After the dropwise addition was completed, the reaction was further continued for one hour. Then, a solution in which 0.42 g of dimethyl 2,2'-azobisisobutyrate was dissolved in 2 g of methyl ethyl ketone was added, and the content of the flask was heated to 78° C. and further heated for 4 hours. The obtained reaction solution was reprecipitated twice with an excess amount of hexane, and the precipitated resin was dried, thereby obtaining 96 g of polymer dispersant P-1.

The composition of the obtained resin was confirmed by $^1$H-NMR. The weight average molecular weight (Mw) was 44,600 as determined by a GPC method. The acid value was 65.2 mgKOH/g determined by the method described in JIS Standard (JIS-K0070 (1992).

Preparation of Resin-Coated Pigment Dispersion
Resin-Coated Cyan Pigment Dispersion 10 parts of Pigment Blue 15:3 (PHTHALOCYANINE BLUE A220, trade name, manufactured by Dainichiseika Color & Chemicals Mfg. Co., Ltd), 5 parts of the polymer dispersant P-1, 42 parts of methyl ethyl ketone, 5.5 parts of a 1 mol/L aqueous NaOH solution, and 87.2 parts of ion exchanged water were mixed and then dispersed in a bead mill for 2 to 6 hours using 0.1 mmφ zirconia beads.

By removing the methyl ethyl ketone and further partially removing water from the obtained dispersion under reduced pressure at 55° C., a dispersion of a resin-coated cyan pigment (color-material particles) having a pigment concentration of 10.2% by mass was obtained.

Resin-Coated Magenta Pigment Dispersion

A dispersion of a resin-coated magenta pigment (color-material particles) was obtained in the same manner as in the preparation of the resin-coated cyan pigment dispersion, except that CHROMOPHTHAL JET MAGENTA DMQ (trade name, Pigment Red 122, manufactured by BASF Japan Ltd.) was used in place of the PHTHALOCYANINE BLUE A220 used as the pigment.

Resin-Coated Yellow Pigment Dispersion

A dispersion of a resin-coated yellow pigment (color-material particles) was obtained in the same manner as in the preparation of the resin-coated cyan pigment dispersion, except that IRGALITE YELLOW GS (trade name, Pigment Yellow 74, manufactured by BASF Japan Ltd.) was used in place of the PHTHALOCYANINE BLUE A220 used as the pigment.

Resin-Coated Black Pigment Dispersion

A dispersion of a resin-coated black pigment (color-material particles) was obtained in the same manner as in the preparation of the resin-coated cyan pigment, except that a pigment dispersion CAB-O-JETTM200 (trade name, carbon black, manufactured by CABOT Japan K.K.) was used in place of the PHTHALOCYANINE BLUE A220 used as the pigment.

Example 1

Preparation of Ink Set 1

A cyan ink (C-1), a magenta ink (M-1), a yellow ink (Y-1), and a black ink (K-1) of an ink formulation 1, and a treatment liquid 1 were individually prepared as follows, and an ink set 1 containing these ink compositions and the treatment liquid 1 was obtained.

Preparation of Cyan Ink (C-1)

Using the dispersion of the resin-coated cyan pigment, the dispersion of the resin-coated cyan pigment, ion-exchanged water, an initiator, a polymerizable compound, and a surfactant were mixed in such a manner as to achieve the following ink formulation 1, and then, the mixture was filtered with a 5 μm membrane filter, thereby preparing the cyan ink (C-1) of the ink formulation 1.

Ink Formulation 1

| | |
|---|---|
| Resin-coated cyan pigment dispersion | 6% |
| IRGACURE 2959 (trade name, manufactured by BASF Japan Ltd.) | 3% |
| Compound 1 represented by Formula (I) | 5% |
| Hydroxyethylacrylamide (HEAAm) (trade name, manufactured by Tokyo Chemical Industry Co., Ltd.) | 10% |
| OLFINE E1010 (trade name, manufactured by Nisshin Chemical Industry Co., Ltd.) | 1% |
| Ion exchanged water | Added to be 100% in total |

The pH (25° C.) of the cyan pigmented ink (C-1) was measured using a pH meter WM-50EG (trade name, manufactured by TOA DKK CORPORATION), and the pH value was 8.5.

Preparation of Magenta Ink (M-1)

The magenta ink (M-1) of the ink formulation 1 was prepared in the same manner as in the preparation of the cyan ink (C-1), except that the resin-coated magenta pigment dispersion was used in place of the resin-coated cyan pigment dispersion. The pH value was 8.5.

Preparation of Yellow Ink (Y-1)

The yellow ink (Y-1) of the ink formulation 1 was prepared in the same manner as in the preparation of the cyan ink (C-1), except that the resin-coated yellow pigment dispersion was used in place of the resin-coated cyan pigment dispersion. The pH value was 8.5.

Preparation of Black Ink (K-1)

The black ink (K-1) of the ink formulation 1 was prepared in the same manner as in the preparation of the cyan ink (C-1), except that the resin-coated black pigment dispersion was used in place of the resin-coated cyan pigment dispersion. The pH value was 8.5.

Preparation of Treatment Liquid 1

The treatment liquid 1 was prepared by mixing the following materials. The pH (25° C.) of the treatment liquid 1 was 1.0 as measured with a pH meter WM-50EG (trade name, manufactured by TOA DKK CORPORATION).

Composition of Treatment Liquid 1

| | |
|---|---|
| Malonic acid (trade name, manufactured by Tokyo Chemical Industry Co., Ltd.) | 25.0% |
| Tripropylene glycol monomethyl ether (trade name, manufactured by Tokyo Chemical Industry Co., Ltd., water-soluble organic solvent) | 5.0% |
| Ion exchanged water | Added to be 100% in total |

Examples 2 to 11

Ink compositions C-2 to C-11, ink compositions M-2 to M-11, ink compositions Y-2 to Y-11, and ink compositions K-2 to K-11 were individually prepared in the same manner as in Example 1, except that the kind of the compound represented by Formula (I) was changed from Compound 1 represented by Formula (I) to Compounds 2, 4, 6, 8, 13, 15 and 17, respectively.

Further, ink sets 2 to 11 were prepared using ink compositions C-2 to C-11, M-2 to M-11, Y-2 to Y-11, K-2 to K-11 and the treatment liquid 1 in the same manner as in the preparation of the ink set 1 using the ink compositions C-1, M-1, Y-1, K-1 and the treatment liquid 1.

Comparative Example 1

Ink set C1 was prepared in the same manner as in Example 1, except that hydroxyethylacrylamide was used in place of the Compound 1 represented by Formula (I).

Comparative Example 2

Ink set C2 was prepared in the same manner as in Example 1, except that the above-described Comparative Compound 1 was used in place of the Compound 1 represented by Formula (I).

Ink-Jet Recording

Tokubishi Art (basis weight: 104.7 g/m$^2$) was prepared as a recording medium (coated paper), and an image was formed as described below. Then, the formed image was evaluated as follows.

Using the ink set 1 containing the cyan ink C-1, the magenta ink M-1, the yellow ink Y-1, and the black ink K-1 obtained above as the ink compositions, a line image and a solid image were formed with the treatment liquid 1 by 4-color single path recording.

The line image was formed by jetting a 1200 dpi line having a 1-dot width, a 1200 dpi line having a 2-dot width, and a 1200 dpi line having a 4-dot width in the main scanning direction with a single path.

The solid image was formed by jetting the ink compositions to the entire surface of the sample obtained by cutting the recording medium into A5 size. Various conditions for recording are as follows.

(1) Treatment Liquid Application Process

The treatment liquid 1 was applied to the entire surface of the recording medium with a roll coater in which a coating amount was controlled by an anilox roller (Number of lines of 100 to 300/inch), so that the application amount was 1.4 g/m$^2$.

(2) Treatment Process

Subsequently, the recording medium to which the treatment liquid 1 was applied was subjected to a drying treatment and a penetration treatment under the following conditions.

Air blowing rate: 10 m/s

Temperature: The recording medium was heated with a contact type plane heater from the surface opposite to the recorded surface of the recording medium (back surface), so that the surface temperature on the recorded surface side of the recording medium was 60° C.

(3) Ink Application Process

Thereafter, the ink compositions were jetted to the surface of the recording medium to which the treatment liquid 1 was applied by an ink-jet method under the following conditions, whereby a line image and a solid image were individually formed. In Example 8, the ink compositions were applied by bar coating, so that a film thickness was 3 μm.

Head: Piezo full line heads of 1,200 dpi/20 inch width were provided for 4 colors.

Amount of jetted liquid droplets: 2.0 pL

Driving frequency: 30 kHz (4) Ink Drying Process

Subsequently, the recording medium to which the ink compositions were applied was dried under the following conditions.

Drying method: Air-blow drying

Air blowing rate: 15 m/s

Temperature: The recording medium was heated with a contact type plane heater from the surface opposite to the recorded surface of the recording medium (back surface), so that the surface temperature on the recorded surface side of the recording medium was 60° C.

(5) Active Energy Ray Irradiation Process

Next, the recorded images were irradiated with ultraviolet rays as an active energy ray using a high-pressure mercury lamp (output 120 W/cm$^2$) so that the energy was 1200 mJ/cm$^2$, thereby obtaining evaluation samples on which images were formed.

Evaluation

The evaluation samples obtained above were subjected to a test for the curing sensitivity of the ink and a test for the blocking resistance of the image as follows. The results are shown in Table 1.

Curing Sensitivity

An un-printed TOKUBISHI ART DOUBLE-SIDED N PAPER (trade name, manufactured by Mitsubishi Paper Mills, Ltd.) was wrapped around a paperweight (weight of 470 g, size of 15 mm×30 mm×120 mm) (contact area of the unprinted TOKUBISHI ART and the evaluation sample: 150 mm$^2$), and then the printed surface of the evaluation sample on which the solid image was formed was rubbed back and forth three times (equivalent to a load of 260 kg/m$^2$). The printed surface after rubbing was visually observed and then evaluated in accordance with the following evaluation criteria.

Evaluation Criteria

A: Peeling of the image (color materials) was not visually confirmed on the printed surface.

B: Slight peeling of the image (color materials) was visually confirmed on the printed surface.

C: Peeling of the image (color materials) was visually confirmed on the printed surface, which was at a practically problematic level.

Blocking Resistance

The evaluation sample on which the solid image was formed was allowed to stand for one day and cut into 2-cm-square pieces. Then, a non-recorded recording medium (the same recording medium as that used for recording (hereinafter referred to as an unused sample in this evaluation)) was placed on the image printed surface of the evaluation sample, a 350 kg/m$^2$ load was applied, and then the sample was allowed to stand under environmental conditions of 60° C. and RH 30% for 24 hours. The unused sample was removed from the evaluation sample, and then, a degree of ink transfer to the blank portion of the unused sample was visually observed and evaluated in accordance with the following evaluation criteria.

Evaluation Criteria

A: No ink transfer was observed.

B: Ink transfer was mostly not noticeable.

C: Ink transfer was observed to a certain degree, which was at a practically problematic level.

D: Ink transfer was conspicuous.

Ink Storage Stability

The prepared magenta ink was stored over a period of 1 week at 50° C. Then, the degree of sedimentation aggregate was visually observed and evaluated in accordance with the following evaluation criteria.

Evaluation Criteria

A: No sedimentation aggregate was observed.

B: Sedimentation aggregate was observed.

C: Sedimentation aggregate was conspicuously observed.

TABLE 1

|  | Ink set | Compound represented by Formula (I) Kind | Content (%) | Other polymerizable compound Kind | Content (%) | Curing sensitivity | Blocking resistance |
|---|---|---|---|---|---|---|---|
| Example 1 | 1 | Compound 1 | 5 | HEAAm | 10 | A | A |
| Example 2 | 2 | Compound 2 | 5 | HEAAm | 10 | A | A |
| Example 3 | 3 | Compound 4 | 5 | HEAAm | 10 | B | A |
| Example 4 | 4 | Compound 15 | 5 | HEAAm | 10 | A | A |
| Example 5 | 5 | Compound 13 | 5 | HEAAm | 10 | A | A |
| Example 6 | 6 | Compound 17 | 5 | HEAAm | 10 | A | A |
| Example 7 | 7 | Compound 1 | 1 | HEAAm | 4 | B | B |
| Example 8 | 8 | Compound 1 | 30 | — | — | A | A |
| Example 9 | 9 | Compound 6 | 5 | HEAAm | 10 | A | B |
| Example 10 | 10 | Compound 8 | 5 | HEAAm | 10 | A | A |
| Example 11 | 11 | Compound 1 | 5 | DAAm | 10 | B | B |
| Comparative Example 1 | C1 | — | — | HEAAm | 15 | C | D |
| Comparative Example 2 | C2 | Comparative Compound 1 | 5 | HEAAm | 10 | B | C |

HEAAm represents hydroxyethylacrylamide.

DAAm represents diacetone acrylamide.

The mark "—" means not included.

It is found that the ink compositions of the invention are excellent in curing sensitivity. It is also found that the images formed by the ink compositions of the invention exhibit excellent blocking resistance. Further, in all of the Examples, evaluation of storage stability of the magenta ink was ranked as A or B.

Furthermore, the evaluations were performed in the same manner as in the above, except that each of treatment liquids 2 to 4 were used in place of the treatment liquid 1. Then, even when the treatment liquids 2 to 4 were each used, images having excellent curing sensitivity and excellent blocking resistance were formed similarly as in the case where the treatment liquid 1 was used. Herein, the treatment liquids 2 to 4 were prepared as follows.

Preparation of Treatment Liquid 2

The following materials were mixed, thereby producing a treatment liquid 2. When the pH (25° C.) of the treatment liquid 2 after adjusting the pH was measured with a pH meter WM-50EG (trade name, manufactured by TOA DKK CORPORATION), the pH was 4.0. Composition of treatment liquid 2

| | |
|---|---|
| Polyethyleneimine (cationic polymer) (A product produced by NIPPON SHOKUBAI Co., Ltd.) | 13.0% |
| Ion exchanged water | Added to be 100% in total |

Preparation of Treatment Liquid 3

The following materials were mixed, thereby producing a treatment liquid 3. When the pH (25° C.) of the treatment liquid 3 was measured with a pH meter WM-50EG (trade name, manufactured by TOA DKK CORPORATION), the pH was 4.0.

Composition of Treatment Liquid 3

| | |
|---|---|
| Magnesium nitrate (polyvalent metal salt) (A product produced by Sigma-Aldrich Corporation) | 15% |
| Diethylene glycol monoethyl ether (A product produced by Tokyo Chemical Industry Co., Ltd.) | 4% |
| Surfactant A below (10% aqueous solution) | 1% |
| Ion exchanged water | Added to be 100% in total |

Preparation of Treatment Liquid 4

The following materials were mixed, thereby producing a treatment liquid 4. When the pH (25° C.) of the treatment liquid 4 after adjusting the pH was measured with a pH meter WM-50EG (trade name, manufactured by TOA DKK CORPORATION), the pH was 5.0.

Composition of Treatment Liquid 4

| | |
|---|---|
| Poly(vinylimidazole) (cationic polymer) | 13.0% |
| GP-250 (trade name, manufactured by Sanyo Chemical Industries, Ltd., water-soluble organic solvent) | 10% |
| Surfactant A below (10% aqueous solution) | 0.2% |
| Ion exchanged water | Added to be 100% in total |

Surfactant A: $C_7H_{15}$—CH═CH—$C_7H_{14}$—C(═O)—N($CH_3$)—$CH_2CH_2$—$SO_3Na$

Evaluations were performed in the same manner as in the above, except that each of OK TOPKOTE PLUS (trade name, manufactured by Oji Paper Co., Ltd., basis weight: 104.7 g/m$^2$) and U-LIGHT (trade name, manufactured by Nippon Paper Group, Inc., basis weight: 104.7 g/m$^2$) was used in place of TOKUBISHI ART (trade name, manufactured by Mitsubishi Paper Mills, Ltd., basis weight: 104.7 g/m$^2$) as a recording medium. As a result, even when the OK TOPKOTE PLUS and the U-LIGHT were used, images having excellent curing sensitivity and excellent blocking resistance were formed as in the case where the TOKUBISHI ART was used.

According to the present invention, an ink composition and an ink set having excellent curing sensitivity, and in which an image formed thereby has excellent blocking resistance can be provided, and an image forming method using the same can be provided.

Embodiments of the present invention include, but are not limited to, the following.

<1> An ink composition comprising a compound having a structure represented by the following Formula (I), a polymerization initiator and water;

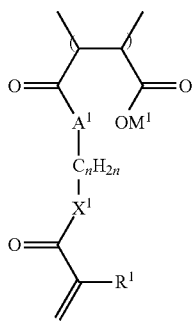

Formula (I)

wherein, in Formula (I), $R^1$ represents a hydrogen atom or a methyl group; $X^1$ represents —O— or —NH—; $A^1$ represents —O— or —NH—; $M^1$ represents a metal atom; and n represents an integer of from 1 to 10.

<2> The ink composition according to <1>, wherein, in Formula (I), $X^1$ is —NH—.

<3> The ink composition according to <1> or <2>, wherein a number average molecular weight of the compound having a structure represented by Formula (I) is from 1,000 to 50,000.

<4> The ink composition according to any one of <1> to <3>, further comprising a color material.

<5> The ink composition according to any one of <1> to <4>, wherein the polymerization initiator comprises a photopolymerization initiator.

<6> The ink composition according to any one of <1> to <5>, further comprising a (meth)acrylamide compound or a (meth)acrylate compound.

<7> An ink set comprising:
the ink composition according to any one of <1> to <6>; and
a treatment liquid capable of forming an aggregate when contacting the ink composition.

<8> The ink set according to <7>, wherein the treatment liquid comprises at least one selected from the group consisting of an acidic compound, a polyvalent metal salt, and a cationic polymer.

<9> An image forming method comprising:
applying the treatment liquid contained in the ink set according to <7> or <8>, onto a recording medium; and
applying the ink composition contained in the ink set, onto the recording medium, to form an image thereon.

<10> The image forming method according to <9>, wherein the recording medium comprises a coated paper.

<11>. The image forming method according to <9> or <10>, wherein the applying of the ink composition comprises applying the ink composition onto the recording medium on which the treatment liquid has been applied in the applying of the treatment liquid.

<12> The image forming method according to any one of <9> to <11>, wherein the applying of the ink composition is applying the ink composition by an ink jet method.

All publications, patent applications, and technical standards mentioned in this specification are herein incorporated by reference to the same extent as if each individual publication, patent application, or technical standard was specifically and individually indicated to be incorporated by reference.

What is claimed is:

1. An ink composition comprising a compound having a structure represented by the following Formula (I), a polymerization initiator and water;

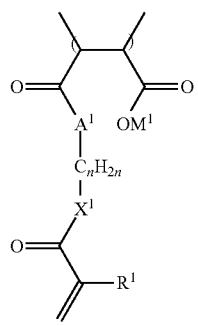

Formula (I)

wherein, in Formula (I), $R^1$ represents a hydrogen atom or a methyl group; $X^1$ represents —NH—; $A^1$ represents —O— or —NH—; $M^1$ represents a metal atom; and n represents an integer of from 1 to 10.

2. The ink composition according to claim 1, wherein a number average molecular weight of the compound having a structure represented by Formula (I) is from 1,000 to 50,000.

3. The ink composition according to claim 1, further comprising a colorant.

4. The ink composition according to claim 1, wherein the polymerization initiator comprises a photopolymerization initiator.

5. The ink composition according to claim 1, further comprising a (meth)acrylamide compound or a (meth)acrylate compound.

6. An ink set comprising:
the ink composition according to claim 1; and
a treatment liquid capable of forming an aggregate when contacting the ink composition.

7. The ink set according to claim 6, wherein the treatment liquid comprises at least one selected from the group consisting of an acidic compound, a polyvalent metal salt, and a cationic polymer.

8. An image forming method comprising:
applying the treatment liquid contained in the ink set according to claim 6, onto a recording medium; and
applying the ink composition contained in the ink set, onto the recording medium, to form an image thereon.

9. The image forming method according to claim 8, wherein the recording medium comprises a coated paper.

10. The image forming method according to claim 8, wherein the applying of the ink composition comprises applying the ink composition onto the recording medium on which the treatment liquid has been applied in the applying of the treatment liquid.

11. The image forming method according to claim 8, wherein the applying of the ink composition is applying the ink composition by an ink jet method.

* * * * *